US011853900B1

(12) United States Patent
Hazard

(10) Patent No.: US 11,853,900 B1
(45) Date of Patent: *Dec. 26, 2023

(54) EVOLUTIONARY PROGRAMMING TECHNIQUES UTILIZING CONTEXT INDICATIONS

(71) Applicant: Diveplane Corporation, Raleigh, NC (US)

(72) Inventor: Christopher James Hazard, Raleigh, NC (US)

(73) Assignee: Diveplane Corporation, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/160,794

(22) Filed: Jan. 27, 2023

Related U.S. Application Data

(63) Continuation of application No. 17/536,981, filed on Nov. 29, 2021, now Pat. No. 11,586,934, which is a continuation of application No. 16/903,901, filed on Jun. 17, 2020, now Pat. No. 11,205,126, which is a continuation of application No. 16/358,217, filed on Mar. 19, 2019, now Pat. No. 10,713,570, which is a continuation-in-part of application No. 15/724,637, filed on Oct. 4, 2017, now Pat. No. 10,296,310.

(51) Int. Cl.
G06F 8/77 (2018.01)
G06N 3/126 (2023.01)
G06F 21/62 (2013.01)

(52) U.S. Cl.
CPC .............. *G06N 3/126* (2013.01); *G06F 8/77* (2013.01); *G06F 21/62* (2013.01)

(58) Field of Classification Search
CPC ..... G06F 8/36; G06F 8/72; G06F 8/77; G06N 3/126

See application file for complete search history.

(56) References Cited

U.S. PATENT DOCUMENTS

| | | |
|---|---|---|
| 4,935,877 A | 6/1990 | Koza |
| 5,581,664 A | 12/1996 | Allen et al. |
| 6,282,527 B1 | 8/2001 | Gounares et al. |
| 6,741,974 B1 | 5/2004 | Harrison et al. |
| 7,437,335 B2 | 10/2008 | Baum |
| 7,873,587 B2 | 1/2011 | Baum |
| 9,489,635 B1 | 11/2016 | Zhu |
| 9,922,286 B1 | 3/2018 | Hazard |
| 10,459,444 B1 | 10/2019 | Kentley-Klay |

(Continued)

FOREIGN PATENT DOCUMENTS

| | | |
|---|---|---|
| WO | WO2017057528 | 4/2017 |
| WO | WO2017189859 | 11/2017 |

OTHER PUBLICATIONS

Abdi, "Cardinality Optimization Problems", The University of Birmingham, PhD Dissertation, May 2013, 197 pages.

(Continued)

*Primary Examiner* — Duy Khuong T Nguyen
(74) *Attorney, Agent, or Firm* — Dority & Manning, P.A.

(57) ABSTRACT

Techniques are provided for determining compatibility of first and second candidate code based on functionality. When the first candidate code and the second candidate code are compatible, third candidate code based is determined based on the first candidate code and the second candidate code. The third candidate that was determined based on the first candidate code and the second candidate code is then provided.

26 Claims, 7 Drawing Sheets

(56) References Cited

U.S. PATENT DOCUMENTS

| | | |
|---|---|---|
| 2001/0049595 A1 | 12/2001 | Plumer et al. |
| 2004/0019851 A1 | 1/2004 | Purvis et al. |
| 2005/0137992 A1 | 6/2005 | Polak |
| 2006/0085558 A1 | 4/2006 | Solomon |
| 2006/0195204 A1 | 8/2006 | Bonabeau et al. |
| 2008/0153098 A1 | 6/2008 | Rimm et al. |
| 2008/0307399 A1 | 12/2008 | Zhou et al. |
| 2009/0006299 A1 | 1/2009 | Baum |
| 2009/0144704 A1 | 6/2009 | Niggemann et al. |
| 2010/0106603 A1 | 4/2010 | Dey et al. |
| 2010/0287527 A1 | 11/2010 | Mitchell |
| 2011/0060895 A1 | 3/2011 | Solomon |
| 2011/0161264 A1 | 6/2011 | Cantin |
| 2011/0225564 A1 | 9/2011 | Biswas et al. |
| 2013/0006901 A1 | 1/2013 | Cantin |
| 2013/0339365 A1 | 12/2013 | Balasubramanian et al. |
| 2016/0055427 A1 | 2/2016 | Adjaoute |
| 2017/0010106 A1 | 1/2017 | Shashua et al. |
| 2017/0012772 A1 | 1/2017 | Mueller |
| 2017/0053211 A1 | 2/2017 | Heo et al. |
| 2017/0091645 A1 | 3/2017 | Matus |
| 2017/0161640 A1 | 6/2017 | Shamir |
| 2017/0236060 A1 | 8/2017 | Ignatyev |
| 2018/0072323 A1 | 3/2018 | Gordon et al. |
| 2018/0089563 A1 | 3/2018 | Redding et al. |
| 2018/0253649 A1 | 9/2018 | Miikkulainen et al. |
| 2018/0336018 A1 | 11/2018 | Lu et al. |
| 2019/0147331 A1 | 5/2019 | Arditi |

OTHER PUBLICATIONS

Aboulnaga, "Generating Synthetic Complex-structured XML Data", Proceedings of the Fourth International Workshop on the Web and Databases. WebDB 2001, Santa Barbara, California, USA, May 24-25, 2001, 6 pages.

Abramson, "The Expected-Outcome Model of Two-Player Games", Phd Thesis, Columbia University, New York, New York, 1987, 125 pages.

Abuelaish et al., "Analysis and Modelling of Groundwater Salinity Dynamics in the Gaza Strip", Cuadernos Geograficos, vol. 57, Issue 2, pp. 72-91, Jun. 4, 2017.

Agarwal et al., "Nearest-Neighbor Searching Under Uncertainty II", ACM Transactions on Algorithms, vol. 13, Issue 1, Article 3, 2016, 25 pages.

Aggarwal et al., "On the Surprising Behavior of Distance Metrics in High Dimensional Space", International Conference on Database Theory, London, United Kingdom, Jan. 4-6, 2001, pp. 420-434.

Akaike, "Information Theory and an Extension of the Maximum Likelihood Principle", Proceedings of the $2^{nd}$ International Symposium on Information Theory, Sep. 2-8, 1971, Tsahkadsor, Armenia, pp. 267-281.

Alhaija, "Augmented Reality Meets Computer Vision: Efficient Data Generation for Urban Driving Scenes", arXiv:1708.01566v1. Aug. 4, 2017, 12 pages.

Alpaydin, "Machine Learning: The New AI", MIT Press, Cambridge, Massachusetts, 2016, 225 pages.

Alpaydin, "Voting Over Multiple Condensed Nearest Neighbor", Artificial Intelligence Review, vol. 11, 1997, pp. 115-132.

Altman, "An Introduction to Kernel and Nearest-Neighbor Nonparametric Regression", The American Statistician, vol. 46, Issue 3, 1992, pp. 175-185.

Anderson, "Synthetic data generation for the internet of things," 2014 IEEE International Conference on Big Data (Big Data), Washington, DC, 2014, pp. 171-176.

Archer et al., "Empirical Characterization of Random Forest Variable Importance Measures", Computational Statistics & Data Analysis, vol. 52, 2008, pp. 2249-2260.

Beyer et al., "When is 'Nearest Neighbor' Meaningful?" International Conference on Database Theory, Springer, Jan. 10-12, 1999, Jerusalem, Israel, pp. 217-235.

Bull, Haploid-Diploid Evolutionary Algorithms: The Ballwin Effect and Recombination Nature's Way, Artificial Intelligence and Simulation of Behaviour Convention, Apr. 19-21, 2017, Bath, United Kingdom, pp. 91-94.

Cano et al., "Evolutionary Stratified Training Set Selection for Extracting Classification Rules with Tradeoff Precision-Interpretability" Data and Knowledge Engineering, vol. 60, 2007, pp. 90-108.

Chawla, "SMOTE: Synthetic Minority Over-sampling Technique", arXiv:1106.1813v1, Jun. 9, 2011, 37 pages.

Chen, "DropoutSeer: Visualizing Learning Patterns in Massive Open Online Courses for Dropout Reasoning and Prediction", 2016 IEEE Conference on Visual Analytics Science and Technology (VAST), Oct. 23-28. 2016. Baltimore, Maryland, USA, 10 pages.

Chomboon et al., An Empirical Study of Distance Metrics for k-Nearest Neighbor Algorithm, $3^{rd}$ International Conference on Industrial Application Engineering. Kitakyushu, Japan, Mar. 28-31, 2015, pp. 280-285.

Colakoglu, "A Generalization of the Minkowski Distance and a New Definition of the Ellipse". arXiv:1903.09657v1, Mar. 2, 2019, 18 pages.

Dernoncourt, "MoocViz: A Large Scale, Open Access, Collaborative, Data Analytics Platform for MOOCs", NIPS 2013 Education Workshop, Nov. 1, 2013, Lake Tahoe, Utah, USA, 8 pages.

Ding, "Generating Synthetic Data for Neural Keyword-to-Question Models", arXiv:1807.05324v1, Jul. 18, 2018, 12 pages.

Dwork et al., "The Algorithmic Foundations of Differential Privacy", Foundations and Trends in Theoretical Computer Science, vol. 9, Nos. 3-4, 2014, pp. 211-407.

Efros et al., "Texture Synthesis by Non-Parametric Sampling", International Conference on Computer Vision, Sep. 20-25, 1999, Corfu, Greece, 6 pages.

Fathony, "Discrete Wasserstein Generative Adversarial Networks (DWGAN)", OpenReview.net, Feb. 18, 2018, 20 pages.

Ganegedara et al., "Self Organizing Map Based Region of Interest Labelling for Automated Defect Identification in Large Sewer Pipe Image Collections", IEEE World Congress on Computational Intelligence, Jun. 10-15, 2012. Brisbane, Australia, 8 pages.

Gao et al., "Efficient Estimation of Mutual Information for Strongly Dependent Variables", $18^{th}$ International Conference on Artificial Intelligence and Statistics, San Diego, California, May 9-12, 2015, pp. 277-286.

Gehr et al., "$AI^2$ : Safety and Robustness Certification of Neural Networks with Abstract Interpretation". $39^{th}$ IEEE Symposium on Security and Privacy, San Francisco, California, May 21-23, 2018, 16 pages.

Ghosh, "Inferential Privacy Guarantees for Differentially Private Mechanisms", arXiv:1603:.01508v1, Mar. 4, 2016, 31 pages.

Gray, "Quickly Generating Billion-Record Synthetic Databases", SIGMOD '94: Proceedings of the 1994 ACM SIGMOD international conference on Management of data, May 1994, Minneapolis, Minnesota, USA, 29 pages.

Hazard et al, "Natively Interpretable Machine Learning and Artificial Intelligence: Preliminary Results and Future Directions", arXiv:1901v1, Jan. 2, 2019, 15 pages.

Hoag "A Parallel General-Purpose Synthetic Data Generator", ACM SIGMOID Record, vol. 6, Issue 1, Mar. 2007, 6 pages.

Imbalanced-learn, "SMOTE", 2016-2017, https://imbalanced-learn.readthedocs.io/en/stable/generated/imblearn.over_sampling.SMOTE.html, retrieved on Aug. 11, 2020, 6 pages.

International Search Report and Written Opinion for PCT/US2018/047118, dated Dec. 3, 2018, 9 pages.

International Search Report and Written Opinion for PCT/US2019/026502, dated Jul. 24, 2019, 16 pages.

International Search Report and Written Opinion for PCT/US2019/066321, dated Mar. 19, 2020, 17 pages.

Internet Archive, "SystemVerilog distribution Constraint—Verification Guide". Aug. 6, 2018, http://web.archive.org/web/20180806225430/https://www.verificationguide.com/p/systemverilog-distribution-constraint.html, retrieved on Mar. 3, 2020, 4 pages.

(56) References Cited

OTHER PUBLICATIONS

Internet Archive, "SystemVerilog Testbench Automation Tutorial", Nov. 17, 2016, https://web.archive.org/web/20161117153225/http://www.doulos.com/knowhow/sysverilog/tutorial/constraints/, retrieved on Mar. 3, 2020, 6 pages.

Kushilevitz et al., "Efficient Search for Approximate Nearest Neighbor in High Dimensional Spaces". Society for Industrial and Applied Mathematics Journal Computing, vol. 30, No. 2, pp. 457-474.

Lin, "Development of a Synthetic Data Set Generator for Building and Testing Information Discovery Systems", Proceedings of the Third International Conference on Information Technology: New Generations, Nevada, USA, Apr. 10-12, 2016, Las Vegas, Nevada, USA, 6 pages.

Montanez, "SDV: An Open Source Library for Synthetic Data Generation", Massachusetts Institute of Technology, Master's Thesis, Sep. 2018, 105 pages.

Negra, "Model of a Synthetic Wind Speed Time Series Generator", Wind Energy, Wiley Interscience, Sep. 6, 2007, 17 pages.

Nguyen et al., "NP-Hardness of ( 0 Minimization Problems: Revision and Extension to the Non-Negative Setting", 13th International Conference on Sampling Theory and Applications, Jul. 8-12, 2019, Bordeaux, France, 4 pages.

Patki, "The Synthetic Data Vault: Generative Modeling for Relational Databases", Massachusetts Institute of Technology, Master's Thesis, Jun. 2016, 80 pages.

Patki, "The Synthetic Data Vault", 2016 IEEE International Conference on Data Science and Advanced Analytics (DSAA), Oct. 17-19, 2016, Montreal, QC, pp. 399-410.

Pei, "A Synthetic Data Generator for Clustering and Outlier Analysis", The University of Alberta, 2006, 33 pages.

Prakosa. "Generation of Synthetic but Visually Realistic Time Series of Cardiac Images Combining a Biophysical Model and Clinical Images" IEEE Transactions on Medical Imaging, vol. 32, No. 1, Jan. 2013. pp. 99-109.

Priyardarshini, "WEDAGEN: A synthetic web database generator", International Workshop of Internet Data Management (IDM'99), Sep. 2, 1999, Florence, IT, 24 pages.

Pudjijono, "Accurate Synthetic Generation of Realistic Personal Information" Advances in Knowledge Discovery and Data Mining, Pacific-Asia Conference on Knowledge Discovery and Data Mining, Apr. 27-30, 2009, Bangkok, Thailand, 12 pages.

Reiter, "Using CART to Generate Partially Synthetic Public Use Microdata" Journal of Official Statistics, vol. 21, No. 3, 2005, pp. 441-462.

Rosenberg et al., "Semi-Supervised Self-Training of Object Detection Models", IEEE Workshop on Applications of Computer Vision, 2005, 9 pages.

Schlabach et al., "FOX-GA: A Genetic Algorithm for Generating and ANalayzing Battlefield COurses of Action", 1999 MIT.

Schreck, "Towards An Automatic Predictive Question Formulation", Massachusetts Institute of Technology, Master's Thesis, Jun. 2016, 121 pages.

Schreck, "What would a data scientist ask? Automatically formulating and solving prediction problems", 2016 IEEE International Conference on Data Science and Advanced Analytics (DSAA), Oct. 17-19, 2016, Montreal, QC, pp. 440-451.

Smith, "FeatureHub: Towards collaborative data science", 2017 IEEE International Conference on Data Science and Advanced Analytics (DSAA), Oct. 19-21, 2017, Tokyo, pp. 590-600.

Stephenson et al., "A Continuous Information Gain Measure to Find the Most Discriminatory Problems for AI Benchmarking", arxiv.org, arxiv.org/abs/1809.02904v2, retrieved on Aug. 21, 2019, 8 pages.

Sun et al., "Fuzzy Modeling Employing Fuzzy Polyploidy Genetic Algorithms", Journal of Information Science and Engineering, Mar. 2002, vol. 18, No. 2, pp. 163-186.

Sun, "Learning Vine Copula Models For Synthetic Data Generation", arXiv:1812.01226v1, Dec. 4, 2018, 9 pages.

Tran, "Dist-GAN: An Improved GAN Using Distance Constraints", arXiv:1803.08887V3, Dec. 15, 2018, 20 pages.

Viera, "Generating Synthetic Sequential Data using GANs", Medium: Toward AI, Jun. 29, 2020, 31 pages.

Wei et al., "An Operation-Time Simulation Framework for UAV Swarm Configuration and Mission Planning", 2013.

Weselkowski et al., "TraDE: Training Device Selection via Multi-Objective Optimization", IEEE 2014.

Wu, "The Synthetic Student: A Machine Learning Model to Simulate MOOC Data", Massachusetts Institute of Technology, Master's Thesis, May 2015, 103 pages.

Xiao, "Towards Automatically Linking Data Elements", Massachusetts Institute of Technology, Master's Thesis, Jun. 2017, 92 pages.

Gemmeke et al., "Using Sparse Representations for Missing Data Imputation in Noise Robust Speech Recognition", European Signal Processing Conference, Lausanne, Switzerland, Aug. 25-29, 2008, 5 pages.

Goodfellow et al., "Deep Learning", 2016, 800 pages.

Google AI Blog, "The What-If Tool: Code-Free Probing of Machine Learning Models", Sep. 11, 2018, https://pair-code.github.io/what-if-tool, retrieved on Mar. 14, 2019, 5 pages.

Gottlieb et al., "Near-Optimal Sample Compression for Nearest Neighbors", Advances in Neural Information Processing Systems, Montreal, Canada, Dec. 8-13, 2014, 9 pages.

Hastie et al., "The Elements of Statistical Learning", 2001, 764 pages.

Hinneburg et al., "What is the Nearest Neighbor in High Dimensional Spaces?", $26^{th}$ International Conference on Very Large Databases, Cairo, Egypt, Sep. 10-14, 2000, pp. 506-515.

Hmeidi et al., "Performance of KNN and SVM Classifiers on Full Word Arabic Articles", Advanced Engineering Informatics, vol. 22, Issue 1, 2008, pp. 106-111.

Houle et al., "Can Shared-Neighbor Distances Defeat the Curse of Dimensionality?", International Conference on Scientific and Statistical Database Management, Heidelberg, Germany, Jun. 31-Jul. 2, 2010, 18 pages.

Indyk et al., "Approximate Nearest Neighbors: Towards Removing the Curse of Dimensionality", Procedures of the $30^{th}$ ACM Symposium on Theory of Computing, Dallas, Texas, May 23-26, 1998, pp. 604-613.

Kittler, "Feature Selection and Extraction", Handbook of Pattern Recognition and Image Processing, Jan. 1986, Chapter 3, pp. 115-132.

Kohavi et al., "Wrappers for Feature Subset Selection", Artificial Intelligence, vol. 97, Issues 1-2, Dec. 1997, pp. 273-323.

Kontorovich et al., "Nearest-Neighbor Sample Compression: Efficiency, Consistency, Infinite Dimensions", Advances in Neural Information Processing Systems, 2017, pp. 1573-1583.

Kulkarni et al., "Hierarchical Deep Reinforcement Learning: Integrating Temporal Abstraction and Intrinsic Motivation", arXiv:1604.06057v2, May 31, 2016, 14 pages.

Kuramochi et al., "Gene Classification using Expression Profiles: A Feasibility Study", Technical Report TR 01-029, Department of Computer Science and Engineering. University of Minnesota, Jul. 23, 2001, 18 pages.

Leinster et al., "Maximizing Diversity in Biology and Beyond", Entropy, vol. 18, Issue 3, 2016, 23 pages.

Liao et al., "Similarity Measures for Retrieval in Case-Based Reasoning Systems", Applied Artificial Intelligence, vol. 12, 1998, pp. 267-288.

Lin et al., "Why Does Deep and Cheap Learning Work So Well?" Journal of Statistical Physics, vol. 168, 2017, pp. 1223-1247.

Lukaszyk, "Probability Metric, Examples of Approximation Applications in Experimental Mechanics", PhD Thesis, Cracow University of Technology, 2003, 149 pages.

Lukaszyk, "A New Concept of Probability Metric and its Applications in Approximation of Scattered Data Sets", Computational Mechanics, vol. 33, 2004, pp. 299-304.

Mann et al., "On a Test of Whether One or Two Random Variables is Stochastically Larger than the Other", The Annals of Mathematical Statistics, 1947, pp. 50-60.

Martino et al., "A Fast Universal Self-Tuned Sampler within Gibbs Sampling", Digital Signal Processing, vol. 47, 2015, pp. 68-83.

Mohri et al., Foundations of Machine Learning, 2012, 427 pages—uploaded as Part 1 and Part 2.

(56) References Cited

OTHER PUBLICATIONS

Olson et al., "PMLB: A Large Benchmark Suite for Machine Learning Evaluation and Comparison", arXiv:1703.00512v1, Mar. 1, 2017, 14 pages.
Pedregosa et al., "Machine Learning in Python", Journal of Machine Learning Research, vol. 12, 2011, pp. 2825-2830.
Phan et al., "Adaptive Laplace Mechanism: Differential Privacy Preservation in Deep Learning" 2017 IEEE International Conference on Data Mining, New Orleans, Louisiana, Nov. 18-21, 2017, 10 pages.
Poerner et al., "Evaluating Neural Network Explanation Methods Using Hybrid Documents and Morphosyntactic Agreement", Proceedings of the 56th Annual Meeting of the Association for Computational Linguistics (Long Papers), Melbourne, Australia, Jul. 15-20, 2018, pp. 340-350.
Raikwal et al., "Performance Evaluation of SVM and K-Nearest Neighbor Algorithm Over Medical Data Set", International Journal of Computer Applications, vol. 50, No. 14, Jul. 2012, pp. 975-985.
Rao et al., "Cumulative Residual Entropy: A New Measure of Information", IEEE Transactions on Information Theory, vol. 50, Issue 6, 2004, pp. 1220-1228.
Ribeiro et al., "'Why Should I Trust You': Explaining the Predictions of Any Classifier", arXiv:1602.04938v3, Aug. 9, 2016, 10 pages.
Schaul et al., "Universal Value Function Approximators", International Conference on Machine Learning, Lille, France, Jul. 6-11, 2015, 9 pages.
Schuh et al., "Mitigating the Curse of Dimensionality for Exact KNN Retrieval", Proceedings of the 26th International Florida Artificial Intelligence Research Society Conference, St. Pete Beach, Florida, May 22-24, 2014, pp. 363-368.
Schuh et al., "Improving the Performance of High-Dimensional KNN Retrieval Through Localized Dataspace Segmentation and Hybrid Indexing", Proceedings of the 17th East European Conference, Advances in Databases and Information Services, Genoa, Italy, Sep. 2013, pp. 344-357.
Schwarz et al., "Estimating the Dimension of a Model", The Annals of Statistics, vol. 6, Issue 2, Mar. 1978, pp. 461-464.
Silver et al., "Mastering the Game of Go Without Human Knowledge", Nature, vol. 550, Oct. 19, 2017, pp. 354-359.
Skapura, "Building Neural Networks", 1996, p. 63.
Stoppiglia et al., "Ranking a Random Feature for Variable and Feature Selection" Journal of Machine Learning Research, vol. 3, 2003, pp. 1399-1414.
Surya et al., "Distance and Similarity Measures Effect on the Performance of K-Nearest Neighbor Classifier", arXiv:1708.04321v1, Aug. 14, 2017, 50 pages.
Tan et al., "Incomplete Multi-View Weak-Label Learning", 27th International Joint Conference on Artificial Intelligence, 2018, pp. 2703-2709.
Tao et al., "Quality and Efficiency in High Dimensional Nearest Neighbor Search", Proceedings of the 2009 ACM SIGMOD International Conference on Management of Data, Providence, Rhode Island, Jun. 29-Jul. 2, 2009, pp. 563-576.
Tishby et al., "Deep Learning and the Information Bottleneck Principle", arXiv:1503.02406v1, Mar. 9, 2015, 5 pages.
Tockar, "Differential Privacy: The Basics", Sep. 8, 2014, https://research.neustar.biz/2014/09/08/differential-privacy-the-basics/ retrieved on Apr. 1, 2019, 3 pages.
Tomasev et al., "Hubness-aware Shared Neighbor Distances for High-Dimensional k-Nearest Neighbor Classification". 7th international Conference on Hybrid Artificial Intelligent Systems, Salamanca, Spain, Mar. 28-30, 2012, 38 pages.
Trautmann et al., "On the Distribution of the Desirability Index using Harrington's Desirability Function", Metrika, vol. 63, Issue 2, Apr. 2006, pp. 207-213.
Triguero et al., "Self-Labeled Techniques for Semi-Supervised Learning: Taxonomy, Software and Empirical Study", Knowledge and Information Systems, vol. 42, Issue 2, 2015, pp. 245-284.
Tuomisto, "A Consistent Terminology for Quantifying Species Diversity? Yes, It Does Exist" Oecologia, vol. 164, 2010, pp. 853-860.
Vacek et al., "Using Case-Based Reasoning for Autonomous Vehicle Guidance", International Conference on Intelligent Robots and Systems, San Diego, California, Oct. 29-Nov. 2, 2007, 5 pages.
Verleysen et al., "The Curse of Dimensionality in Data Mining and Time Series Prediction" International Work-Conference on Artificial Neural Networks, Barcelona, Spain, Jun. 8-10, 2005, pp. 758-770.
Wachter et al., "Counterfactual Explanations Without Opening the Black Box: Automated Decisions and the GDPR", Harvard Journal of Law and Technology, vol. 31, No. 2, Spring 2018, 47 pages.
Wang et al., "Falling Rule Lists" 18th International Conference on Artificial Intelligence and Statistics, San Diego, California, May 9-12, 2015, 10 pages.
Xu et al., "An Algorithm for Remote Sensing Image Classification Based on Artificial Immune B-Cell Network", The International Archives of the Photogrammetry, Remote Sensing and Spatial Information Sciences, vol. XXXVII, Part 86b, Beijing China, Jul. 3-11, 2008, 6 pages.
Zhao et al., "Semi-Supervised Multi-Label Learning with Incomplete Labels", 24th International Joint Conference on Artificial Intelligence, Buenos Aires, Argentina, Jul. 25-31, 2015, pp. 4062-4068.

EVOLUTIONARY PROGRAMMING TECHNIQUES UTILIZING CONTEXT INDICATIONS

PRIORITY CLAIM

The present application is a continuation of U.S. patent application Ser. No. 17/536,981 filed Nov. 29, 2021, which is a continuation of U.S. patent application Ser. No. 16/903,901 filed Jun. 17, 2020, which is a continuation of U.S. patent application Ser. No. 16/358,217 filed Mar. 19, 2019, which is a continuation-in-part of U.S. patent application Ser. No. 15/724,637 filed Oct. 4, 2017. Applicant claims priority to and the benefit of each of such applications and incorporates all such applications herein by reference in its entirety.

FIELD OF THE INVENTION

The present invention relates to computer-based optimization and artificial intelligence techniques and in particular to evolutionary programming techniques utilizing context indications.

BACKGROUND

Evolutionary programming techniques often work well because they combine and/or modify code in ways that programmers would not have thought of or chosen to experiment with. Generally, though, evolutionary programming techniques perform with little or no knowledge of or guidance related to the context of the programs that are being combined and/or modified. As such, these techniques lack the ability to make evolutionary programming changes based on those known aspects and may take too long to evolve code in a beneficial manner.

For example, evolutionary programming techniques may be used to evolve a set of programs that, at least in part, calculate a sine function. In general, the evolutionary programming technique might combine two programs, but not know where the sine function calculation is located within the code. As such, it may evolve the sine function based on a combination of the sine function in one set of code with code that calculates something other than the sine function from the other set of code. As such, the result is less likely to result in a beneficial outcome (e.g., a better functioning or "higher fitness" program, by whatever measure might be appropriate). Even if the evolutionary programming technique uses a code-matching algorithm to attempt to find portions of the code that are similar between the two programs, it might fail. For example, even assuming that the code-matching algorithm did find the closest code segments between two programs, depending on the implementation, the code for calculating sine in the first program may actually be more similar to the code for calculating cosine in the second program that it is to the code for calculating sine in the second program. As such, the evolutionary programming technique that used this matching might combine and evolve the code for calculating sine with the code for calculating cosine.

As used herein, "code", "set of code" or "code set" are broad terms, encompassing numerous embodiments, including, without limitation, full programs (whether compilable, interpretable, executable, or the like), portions of programs, libraries, context-action pairs, data and data structures, and the like.

Techniques herein address these issues.

SUMMARY

The appended claims may serve as a summary of the invention

DETAILED DESCRIPTION

Figure 1:
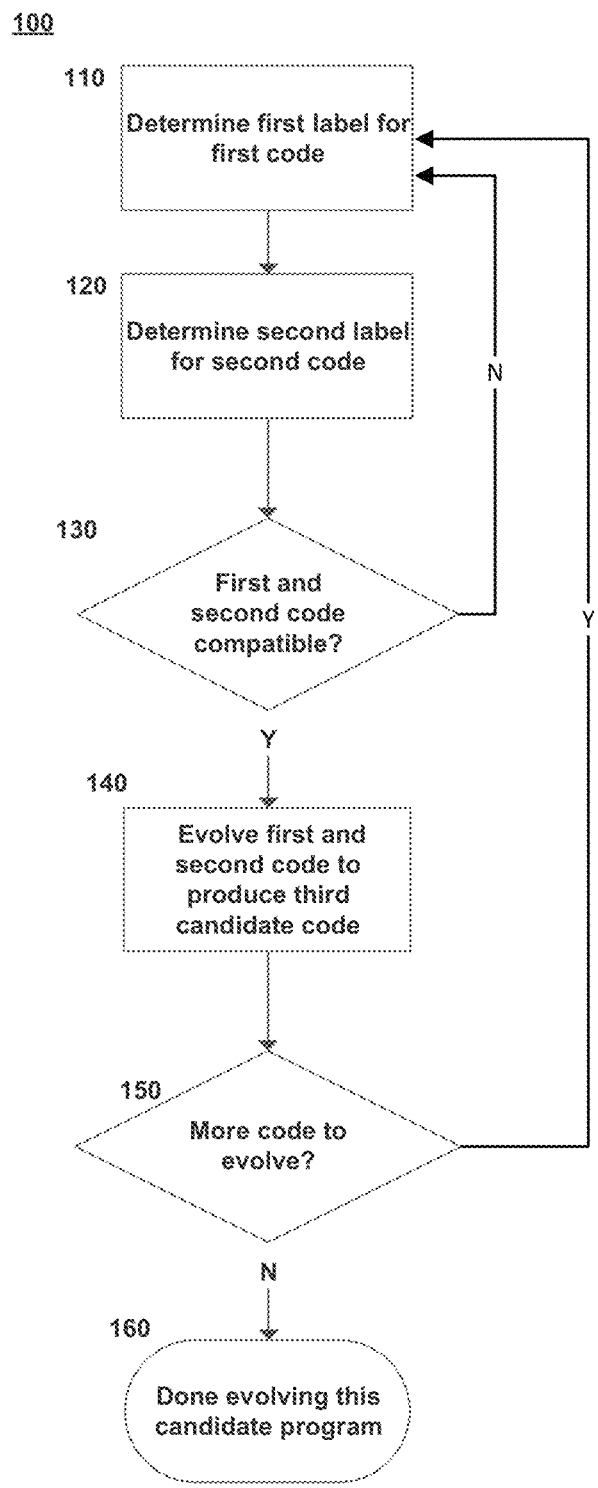
FIG. 1 is a flow diagram depicting example processes for evolving candidate code utilizing context indications.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The techniques herein use labels or annotations to help guide the code evolution process. Similar or identical labels across multiple programs can, in some embodiments, guide the selection of what code segments to combine either as a rule (e.g., a label must exist and be identical in order to combine/evolve to two corresponding code segments) or as a weight favoring combination (e.g., a label on two code segments may increase the likelihood that two code segments are combined/evolved). Further, the existence of matching labels may also reduce computational time used to compare code segments (e.g., if labels for two code segments match, then the two might be combined without further comparison of the code segments).

As noted, in some embodiments, the techniques herein evolve programs based, at least in part, on labels for portions of code. For example, if it is known that a particular portion of code calculates the result of the sine function, that portion of the code can be demarcated as such, with a modifier such as/SINE at the beginning and \SINE at the end, starting with #SINE and ending with SINE #, #SINE at the top of the relevant portion of the abstract syntax tree, or the like. Since that section of code is labeled, when the evolutionary programming techniques are performed, they can use the label as a signal for what to mix, replace, and modify.

As a more complex example, consider a self-driving mail delivery vehicle's control code. The code for the controller of a self-driving mail delivery vehicle (it might be called, e.g., a "mailcart") may have numerous labeled sections of code such as #turnleft, #turnright, #slowdown, #speedup, and #delivermailright. If there are multiple self-driving mailcart simulators, and each has those five labels (and possibly more), the evolutionary programming techniques herein may combine, modify, replace, and/or evolve the code based, at least in part, on those labels. For example, it may replace the #leftturn from one simulator with that of another, evolve based on one or both of the #leftturn code segments, etc.

As another example, if a new self-driving mailcart controller is being developed and it does not yet have one or more of the sections of code, e.g., it does not have #turnleft, then the techniques herein may perform evolutionary experiments where the code associated with one or more other candidate #turnleft code may be used to experiment with adding code associated with that label to the new self-driving mailcart controller.

The techniques herein can be used to help evolve executable (or compilable, etc.) code as well as context-action pairs for computer-based reasoning systems. For example, staying with the self-driving mailcart example, #turnleftpair may be associated with one or more training context-action pairs, either in the same code set or in multiple code sets. Those #turnleftpair labels associated with training context-action pairs may indicate decisions to be made in certain contexts. If a label is associated with the training context-action pairs, then the labels may be used as described herein to evolve those training context-action pairs.

Various other techniques and embodiments are described herein dealing with required matching vs. suggested matching, hierarchical labels, multiple labelling, security around sharing of labels, using labels to find "nearby" or "close" sections of code, in addition to other techniques and embodiments.

As described more herein, techniques herein, in addition to evolving certain portions of code based on labels may also evolve other portions of code irrespective of labels. Further, evolved code may be tested for fitness, and once exit criteria is met (e.g., a fitness score above a certain threshold, performance of a certain number of iterations or generations of evolution, etc.) the techniques may provide the evolved code for use.

Evolving Candidate Code Utilizing Context Indications

FIG. 1 depicts a process 100 for evolving candidate code utilizing context indications. In process 100, labels for first and second code are determined 110 and 120, and a determination is made whether the two labels are compatible 130. If the labels are compatible 130, then third candidate code is evolved 140 from the first and second code. If there is more 150 code to evolve, then the process determines 110 and 120 more labels, otherwise, process 100 is done 160 evolving candidate code.

In the examples given, two sections of code with corresponding labels are discussed primarily. The techniques herein apply more broadly, however. For example, it is possible that more than two sections of code might be compared, and the resulting code may be evolved 140 based on all of the two or more sections of code. Further, more than one resulting code may be evolved 140. For example, one or more "input" code segments may be evolved 140 to produce two or more "output" segments of code. In addition, a label may apply to be associated with, an entire program (or more than one portion); code, code segments, or a portion of a program; context-action pairs, data, data structures, databases; and the like.

Returning to the top of FIG. 1, determining 110 and 120 labels for first and second candidate code can take many forms. In some embodiments, the labels are placed on sections of code by programmers of the code. In some embodiments, labels can be placed after code is programmed, e.g. by other programmers, smart systems for labelling code, etc. Placed labels may be combined and used with other systems for labelling, such as function names.

The determined 110 and 120 labels correspond to first and second code. The first and second code may be from separate programs, but, in some embodiments, they may be from the same program. For example, if combining two programs, the first and second code may be each be labeled #SINE and may be combined at least in part based on the use of that label. If the first code and second code are from the same program, the labels may still be identical. For example, if code has multiple sections labelled #GRAVITY_CONSTANT, the techniques herein may combine the code based on the use of that same label in the one program. Relatedly, it is possible that a single program will use a label more than once. In some embodiments, if a label is used more than once in the same program, then the techniques herein may use one labeled set of code as the code associated with that label (ignoring, in some respects, the other code associated with that label), and may choose one or the other set of code associated with that label based on some decision criteria, such as shortest or longest code segment, most dislike or alike to other code (e.g., from another program) being combined, first or last occurrence of the label, etc.

Code segments may be associated with more than one label (or no labels at all). For example, one sequence of code may be associated with more than one label, and those labels may be queried simultaneously or separately. If a segment of code is identified with #SINE and #MATH, the segment may match a query for either or both of those labels. As noted above, it is not necessarily the case that all code in a program is associated with a label. Further, code associated with a label may be executable code, a context-action pair or other data, etc. In some embodiments, a program as discussed herein can be a computer program that is executable, interpretable, compilable, etc.

In addition to being associated with code, labels can have or be associated with one or more values, data structure, lists, vectors, matrices, functions, objects, code, and the like. For example, a program may have a section of code labeled with #X, #Y, and #Z, and each of those may be associated with a value. These labels can be compared for compatibility with other labels #X, #Y, and #Z as described herein, but, additionally, determinations can be made based on the values associated with the labels. The values associated with the labels can be compared in any appropriate manner. For example, the property of identity may be required (values for #X, #Y, and #Z must all be exactly some value). In some embodiments, a "premetric" could be determined for the values associated with labels. The term premetric as used herein in this context is a broad one encompassing many meaning and embodiments, including Euclidean distance, Minkowski distance, Damerau-Levenshtein distance, Kullback-Leibler divergence, and/or any other distance measure, metric, pseudometric, premetric, index, and the like. In some embodiments, the premetric requires one or more of the properties of:

symmetry, meaning $d(P1, P2)=d(P2, P1)$, where $Pn = (\#Xn, \#Yn, \#Zn)$ and distance from P1 to P2 is denoted $d(P1, P2)$;

non-negative range, meaning $d(P1, P2)>=0$;

indiscernible identity, meaning if $d(P1, P2)=0$, then $P1=P2$; and triangle inequality, meaning $d(P1, P2)<=d(P1, P2)+d(P2, P3)$.

In some embodiments, only symmetry and loose nonnegative range may be required for a premetric. It may be the case that additionally enforcing indiscernible identity and triangle inequality may allow algorithmic efficiencies, such as reduced computational time. As another example, embodiments using Kullback-Leibler divergence as a premetric may only indiscernible identity and nonnegativity properties may be required.

As another example of a premetric, consider a query on Euclidean distance. A determination could be made that two code segments are "nearby", "close", or "within a threshold distance" (e.g., a first code segment may be associated with #X=1, #Y=1, #Z=0; and a second may be associated with #X=1, #Y=1, and #Z=0.1 would have a Euclidean distance of 0.1 and may satisfy the query). More complicated compatibility measures or queries might also be used, and might be based on multiple labels. For example, returning to the mailcart example, a compatibility measure might be based on code (in this case, e.g., perhaps the code is a context-action pair) that is labeled with #turnleft, #CAP, and within Euclidean distance of forty meters of the center of a particular intersection (based on #X, #Y, and #Z) in order to obtain just left turn context-action pairs for a particular intersection.

In some embodiments, an abstract syntax tree may represent the determined 110, 120 first code and second code. The embodiments may use a generalization of Damerau-Levenshtein distance (DLD) to match parts of the abstract syntax trees. DLD may be implemented using a dynamic programming solution and/or implemented using a recursive search. Generalized DLD may apply not just to character strings but also to any part of an abstract syntax tree using the context of what is appropriate for each node, which can include unordered lists, ordered lists, associative arrays, etc. Labels can reduce the problem size by cutting off branches of the recursive search (based on label compatibility). For example, if a label matches exactly, other branches of comparison can be avoided entirely. Labels can also add to (or detract from) the weights of the matches which can improve the quality of the result and/or improve performance. Labels can also be used as in combination with a threshold to improve the quality of the results while also improving performance; for example, code with mismatched labels will not match unless it is 100% match and larger than a certain threshold size, in which case the code match overrides the label, or a threshold could be used which is a combination including number of label matches, number of label mismatches, code size, and code matching metrics. In some embodiments, if the labels are assigned to portions of the abstract syntax tree, the use of the labels can speed up graph matching.

In some embodiments, labels can be associated with a single value, as in the Euclidean distance example above, or with multiple values, characters or strings, objects, functions or other executable code, and/or the like. If a single value is associated with a label, then various premetrics, indexes, distances, divergences can be applied to the values (e.g., Euclidian distance discussed elsewhere herein). If multiple values are associated with a label, then similar premetrics can be applied. For example, a label #P could be associated with an (X, Y, Z) location tuple and be amenable to premetric distance calculations. If a label is associated with a character or a string, other premetrics can be used, such as Levenshtein distance or Hamming distance. If a label is associated with objects, functions, or other executable code, the premetric for the label may be based on any appropriate measure, such as identity of the code, output of the executable code, similarity metrics of the code, and the like.

In some embodiments, the value or other item associated with a label may be used in conjunction with the label itself in order to determine compatibility of a label. For example, a compatibility measure may require both the existence of identical labels (#X, #Y, and #Z), as well as a Euclidean distance below a certain threshold.

In some embodiments, labels can be hierarchical, depending on a single parent, or multiple. For example, #hardleft, #slowleft may be sublabels of #turnleft. #hardleft may also be a sublabel of #aggressivedriving and/or #makeuptime. Hierarchical labels may be used in the same way and provide the same benefits as other types of labels described herein.

In some embodiments, some of the labels can be "escaped out" or otherwise hidden. A sample syntax for this could be ##turnleft (note the double hash). An escaped-out label can take on many meanings. For example, it may be an indicator in a class (e.g., in an object-oriented programming language) that instantiations or further copies should contain the label. In some embodiments, escaping out a label indicated a lower weight (or higher weight, depending on the implementation), for the label. For example, a double hash may indicate that the label is a suggestion on the code, whereas a single hash may indicate that a label is a requirement (e.g., must match the label in order for code to be compatible 130).

In some embodiments, there can be security associated with one or more labels. This may be useful, e.g., when evolving code that is obtained from the Internet, or otherwise not trusted. In such situations, it could be that only a subset of labels from the secured code are available to for use in evolution with other code. Additionally, it could be the case that the secured code can only be evolved with other code though the interaction with a pre-defined set of labels, and other labels in the code may be ignored.

The first and second code can be checked for compatibility 130 based at least in part on the associated labels. Checking code for compatibility can take many forms. For example, in some embodiments, if a label is considered a "rule", then if the first and second label do not match that the compatibility 130 check stops there and process 100 returns to determine 110 and 120 more labels. In some embodiments, if a label is considered a "rule" it may be that if label one and label two match, no further checking is performed and the two code segments are considered compatible 130. In yet other embodiments, a "rule" label, if matched between the first and second code, may still require a check of the first and second code for compatibility. In some embodiments, "escaped" labels (e.g., ##turnleft) might be considered suggestions and non-escaped labels (e.g., #turnleft) might be considered rules. A check for compatibility of code may include checking the similarity of the code in any applicable manner, such as check based similarity after performing whitespace and variable name de-sensitivity, noise suppression for similar and identical functions (e.g., "sin( )", "sine( )", "SINE( )", etc.), position independence where appropriate (e.g., order of definition of variables is not an indicator of difference), etc.

Compatibility 130 of labels may also be based on comparison of more than one label on either or both of the first and second code. For example, the first code (a context-action pair, e.g.) may have therewith associated a #X, #Y, and #Z and #turnleft labels, and second code (another context-action pair, e.g.) may have therewith associated #P (a point in space) and #turnleft labels, and checking compatibility (e.g., are these two left turns that were made at the same intersection) may include checking the distance between the first and second code (based on the #X, #Y, and #Z vs. #P), and that they both have #turnleft labels. If the distance is less than a certain threshold (e.g., 50 or 100 feet), then the two may be considered "close enough" to be left turns at the same intersection. Comparing compatibility may also include comparing the compatibility of a single label with two or more labels on another section of code. For example, the first code (executable code) may have therewith associated #MATH_CALC and #SINE labels, and the second code (also executable code) may have therewith associated just a #sinusoid label. Determining compatibility may include determining that the non-identical #sinusoid label is related to the #SINE label, and that alone may be determined as sufficient for compatibility; and/or that the #sinusoid label is related to the #SINE label and the #MATH_CALC label. One the other hand, if the second set of code was labeled #sinusoid and #graphics_display, then it may be determined that the first and second sets of code are not compatible if the system assumes incompatibility between sections of code that are for mathematical calculation (#MATH_CALC, the first code) and those that are for graphical display of functions (#graphics_display, the second code).

As another example, a first program may have separate code for left turns (labeled #turnleft) and rights turns (labeled #turnright) and a second program may have a code that handles right and left turns (labeled just #turn and/or labeled #turnright and #turnleft). Comparing the code for compatibility may include determining whether the #turn label is compatible with either the #turnleft (or #turnright) labels. Checking compatibility 130 of the code may also include determining whether second code (form the second program) with #turn, #turnleft, and #turnright labels is compatible with first code (from the first program) labeled #turnleft (or #turnright). In some embodiments, the first code labeled with #turnleft may be determined to be compatible with the second code labeled #turn, #turnleft, and #turnright and the first and second code may be evolved together. For example, it could be the case that the compatibility determination is made in the affirmative because code for turning right is similar enough to code for turning left for the two to be combined. If, however, first code for turning left is not compatible with the second code for turning either direction from the second program, then the first code may be determined to be incompatible with the second code, notwithstanding that both could be used for turning left.

As alluded to above, compatibility 130 may also be determined based on queries, such as premetric, logical or Boolean, and other types of queries. For example, a distance premetric query may look at the values associated with labels (e.g., #X, #Y, and #Z) and determine a distance between the first and second code, or based on a distance to a known point (e.g., the Euclidean origin or any other point). In some embodiments, more complex queries can be used to determine compatibility. For example, the compatibility 130 test may be that the first and second code have the same #turnleft label, and meet a distance from the origin of a known intersection by forty meters as measured using #X, #Y, and #Z.

In some embodiments, hierarchical labels are used and compatibility 130 may be determined at least in part based on the hierarchy of labels one and two. In some embodiments, labels might be determined as compatible or at least more likely to be compatible even if not identical, if they are above (or below) in the same hierarchy. For example, a #turnleft label may have two children #hardleft and #softleft, and one parent #turn, which in turn has a parent label #navigate. In determining compatibility 130, a label may be considered a match with one or both of a parent and child label. So, a compatibility determination may be made (or more likely to be made) if the first code has a #turnleft label and the second code has one of the child (e.g., #had left) or parent (#turn) labels. The further-away labels (e.g., comparing #hardleft to great grandparent #navigate) may be given lower or no weight in making, or may preclude a compatibility 130 determination. In some embodiments, an exact match of the first and second label (two #turnlefts) might be given more weight than hierarchically-related labels (e.g., #turnleft with #hardleft).

In some embodiments, similar, but not identical labels might be matched. For example, # SIN and # SINE; and #turnleft and #turntotheleft might each be treated as similar, matching labels when making a compatibility 130 determination. In some embodiments, identical labels may be given the same weight as similar labels when making a compatibility 130 determination. In other embodiments, identical labels may be given a higher weight than labels that are only similar when making compatibility 130 determinations.

In some embodiments, a determination of compatibility 130 may only be performed if the security of the label and/or code is appropriate. For example, if only a certain set of labels is available to a particular input code (and/or access is limited to the code associated with those labels), a compatibility 130 determination may be made only if the labels being consider meet that security consideration. In some embodiments, the compatibility 130 determination will be performed, but will fail if a security consideration is not met.

In some embodiments, one segment of code will not be determined as compatible 130 with a second set of code if the second set of code is not labeled and/or if the code is labeled with a different (e.g. not similar) label. E.g., if one set of code is labeled with #turnleft and a second set of code is not labeled, or is labeled with #slowdown, then it will not be indicated as compatible 130.

If the first and second code are not compatible 130, subsequent sets of code and corresponding labels are determined 110 and 120. If the first and second code are compatible 130, then the first and second code are evolved 140 to produce third candidate code. Any appropriate technique for evolving code may be used. For example, the first and second code could be evolved 140 based on a combination of the first and second code, could be mutated before and/or after the combination of the first and second code, could be combined with other code (e.g. other than the first and second code), and the like.

Evolving 140 third candidate code from the first and second code can take many forms. Further, candidate code may be evolved from a single set of code, from two sets of code, as depicted in FIG. 1, or from three or more sets of code, etc. In some embodiments, two or more candidate code sets may be evolved 140 based on the one or more programs (not depicted in FIG. 1). For example, the techniques described with respect to evolving 140 and elsewhere herein could be used to produce two or more candidate code sets from either or both of the code sets for which labels were determined 110 and 120, from other or additional code sets, including evolving based on more than two code sets. Evolving the first and second code may include performing crossover, mutation, and the like on the first and second code in order to produce the third code. Evolving 140 code may also be termed 'determining' 140 code.

In some embodiments, evolving 140 code is accomplished by using a population of code sets that include executable, interpretable, or compilable code, or the like. This may include evolving 140 high-performing labeled executable code set with a compatible high-performing executable code set to produce further candidate executable code sets. These executable code sets may be compared or compatibility 130, then combined, evolved, mutated, etc. For example, in some embodiments, portions of the first code set and the second code set can be combined in order to produce the third code set (or an interim code set that is further modified). This combination can encompass selecting one of the two code sets, selecting portions of each code set (including more than a combined 100% of each code set), etc. For example, if the first and second code are each represented by portions of an abstract syntax trees (each with a compatible label at the top), evolving 140 the code may encompass taking all of one or the other of the labeled portions of the abstract syntax trees, or taking a portion of one abstract syntax tree and a portion of the other abstract syntax tree.

The labeled code may also be represented executable, interpretable, or compilable code. As a simple example, consider #TTT (Tic Tac Toe) labeled code sets that play a game of tic-tac-toe, where the tic-tac-toe board is addressed in this manner:

{(0,0) (0,1) (0,2)
(1,0) (1,1) (1,2)
(2,0) (2,1) (2,2)}

One code set for playing tic tac toe might perform the following steps (written in pseudo code):

Set 1:
if ISEMPTY(1,1), PLACESYMBOL (1,1)
elseif ISEMPTY(0,0), PLACESYMBOL (0,0)
elseif ISEMPTY(0,1), PLACESYMBOL (0,1)
. . .

A second candidate executable code set might be
Set 2:
if ISEMPTY(0,0), PLACESYMBOL (0,0)
elseif ISEMPTY(0,1), PLACESYMBOL (0,1)
elseif ISEMPTY(0,2), PLACESYMBOL (0,2)
. . .

Evolving 140 these two executable code sets may entail, combining the first code set and the second code set. For example:

Resultant code set Resultant.A:
(was 1.i) if ISEMPTY(1,1), PLACESYMBOL (1,1)
(was 2.ii) elseif ISEMPTY(0,1), PLACESYMBOL (0,1)
(was 2.iii) elseif ISEMPTY(0,2), PLACESYMBOL (0,2)
. . .

The first and second code may also be mutated along various dimensions, either before or after it is combined as part of the evolution 140. Mutating may include new commands being inserted, commands being deleted or changed, variables being altered, etc. For example, the resultant haploid code set A might be mutated with respect to the parameters passed, such as replacing one of the integer parameters with a random integer (underlined for emphasis):

Mutated resultant haploid set A (only set):
(was 1.i) if ISEMPTY(1,1), PLACESYMBOL (1,1)
(was 2.ii) elseif ISEMPTY(0, RANDOM_INTEGER (0 . . . 2)),
PLACESYMBOL (0, RANDOM_INTEGER(0 . . . 2))
(was 2.iii) elseif ISEMPTY(0,2), PLACESYMBOL (0,2)
. . .

In many of the examples herein, two separate code sets are compared, and/or evolved 140 to form a single set of candidate code. In some embodiments, the sets of code sets each come from a separate source (e.g., two programmers named or teams led by Alicia or Bob), or more than two sources (e.g., programmers named or teams led by Alicia, Bob, Charles, etc.) In the embodiments where the code being evolved is from a single source (potentially even from a single computer program) code sets may be combined and evolved based on labels. For example, Alicia's single program might include multiple #turnleft-labeled code sections (either as part of a single program or from separate programs). In some embodiments, the labeled #turnleft code sections might be compared for compatibility 130, and a subset of those evolved 140 as discussed herein. Additionally, in some embodiments, there may be multiple code sets for a single programmer (e.g., Alicia or her team have programmed multiple mailcart programs, each with a #leftturn labeled section). In such embodiments, the multiple code sets may be compared, selected, and combined in a manner similar to what is described herein for multiple code sets from multiple programmers.

As discussed, the techniques herein also apply to code of more than two programmers or teams (e.g., Alicia, Bob, Charles, etc.). Consider for example, four code sets from Alicia, Bob, Charles, and Diane. The techniques herein may combine the code sets from any combination of Alicia, Bob, Charles, and Diane together, including comparing, selecting, and combining code sets of one programmer with those of the same programmer as described in the single-programmer context. When there are more than two code sets from multiple programmers, the labeled code sets from the programmers may be compared, selected, and evolved in various ways. For example, the code sets may be paired off and combined in pairs in a manner similar to that described for the two code set embodiments and examples. As another example, in some embodiments, more than two or all the code sets may be compared, pairs selected, and combined. For example, if a code set from Diane is compared against the code sets of Alicia, Bob, and Charles, there may be pairs selected that represent code sets from various combinations such as Diane:Alicia, Diane:Bob, and Diane:Charles. If this comparison is performed among all of the sets of code sets, then the possible combined pairs could be from all (or some subset of) combinations of Alicia, Bob, Charles, and Diane.

In some embodiments, the two received code sets for which labels were determined 110 and 120 can be combined and merged, can be mutated, etc. An example of evolution 140 might have two code sets, in this case context-action pairs, between #leftturnCAP-label context-action pairs from Alicia and Bob:

| | Alicia #leftturnCAP | Bob #leftturnCAP |
|---|---|---|
| Left lane ("LL", Boolean) | 1 | 1 |
| Left Turn Signal On ("LT", Boolean) | 1 | 1 |
| Distance to Light ("DTL") | 120' | 110' |
| Speed of vehicle, MPH | 15 | DTL/10 |
| Action to be taken | Turn left at 0.7° | Turn left at 0.7° |

Combining these two code sets could take all identical elements between the two, and keep those. For the non-identical elements, the DTL and speed, one or the other might be chosen (at random or based on some other criteria), a random number between the two might be chosen, etc.

In various embodiments, code sets can also be mutated (before, after, or as part of evolving 140). For example, returning to the context-action pair example above, one or more elements of the context or action may be mutated. This can be advantageous to give the population extra variance. If the resultant code after mixing Alicia and Bob above was written on the left, it might be mutated as shown on the right below:

|  | Result of cross-over between Alicia and Bob #leftturnCAP | After mutation |
|---|---|---|
| Left lane ("LL", Boolean) | 1 | 1 |
| Left Turn Signal On ("LT", Boolean) | 1 | 1 |
| Distance to Light ("DTL") | 112.5' | 99' |
| Speed of vehicle, MPH | 7.5 + DTL/20 | Speed = 1 + DTL/11 |
| Action to be taken | Turn left at 0.7° | Turn left at MAX(30°, 50/DTL °) |

As depicted, the mutation can be of the context and/or the action to be taken. Further, mutations can include replacing numbers or constants with functions and/or variables, and vice-versa, as well as replacing numbers with numbers or functions with functions. Such functions can be based on, for example, one of the context variables. As depicted above, the speed and action to be taken were each mutated to a function of DTL. In some embodiments, mutations may also include removing actions (leaving the action empty or making the action a NULL), as well as mutating NULL or empty actions to include an action.

Mutations may be done randomly, or based on "seeding" the system with various parameters. For example, those working on the system, such as programmers, operators, trainers, etc. may know that the angle of a turn should increase and the speed should decrease the closer a vehicle gets to making a turn, but not know which function is correct. So, they may provide seed functions or general constraints, and the system may "experiment" with various functions that use those seed function and/or meet those general constraints. For example, the system may be seeded with various functions or portions of functions for turn angle, for example, the system could be seeded that the turn angle is likely the function of one or more of sin(speed), cos(speed), 1/speed, 1/DTL, speed, DTL, min(0°), max (30°), etc. Then the system could insert one or more of these elements to make functions for the left turn angle. This could be done while taking into account the candidate code (Alicia's, Bob's, or a mixture thereof), or may be independent of the candidate code.

In some embodiments, the mutations are a resampling of numbers in the context and/or action. For example, the resampling of numbers in the context and/or action may simply be varying the code set numbers using any function, including: sampling within a set percent, sampling the numbers over the observed range of the numbers, or resampling using a maximum entropy distribution with a mean at the number from the original code. As an example of maximum entropy distribution, if a number from the context or action is known to be nonnegative but no other domain knowledge is known about the distribution of that number in other contexts/actions, a resample may consist of drawing a random number from the maximal entropy distribution for a nonnegative number for a given mean, namely an exponential distribution, whose mean is represented by the original number from the context or action. For example, just looking at the sample from Alicia, the distance to the light might be resampled using a maximum entropy distribution with mean of 120', which might result in a DTL of 112.5'. Further, if the code set has certain observed properties, then the mutated number may be constrained to meet those properties. For example, if observed values are positive, the system may maintain the mutated value as a positive value. If the observed values are integers, the system may maintain the mutated value as an integer.

If something is known about the domain, it can be used in the system to hold the mutations within those known constraints. As such, in some embodiments, the system can allow a domain expert to constrain parts of the context and/or the action. For example, if it is known that Left Lane (LL) is Boolean, then the system can constrain any mutations to being either 0 or 1 (or True or False, depending on the implementation).

In some embodiments, the system may include per-context-field modifiers or constraints. These can be the same or different between code sets. These modifiers might act on the data in the code set. Such actions might be a Get (e.g., clamp), Mutate (e.g., force resampling in a certain range), or Mix (e.g., average for two inputs, return one or the other), or another function or constraint. These modifiers can be useful in instances where one might want to override the default way in which the system operates. Further, modifiers might be useful, for example, when you want the code set to abide by certain constraints, even if the experts or programmers did not abide by those constraints. One such example is abiding by speed limits or norms. Modifiers might be used to clamps the speed of the training drivers. For example, Alicia's code set may have a modifier that clamps speed between 0 and 50 MPH, and Bob may have the same constraint, or a different constraint such as clamping speed between −10 and 45 MPH. Any training value outside those constraints may be clamped back to those values. When the modifiers are the same between two candidate code sets being combined, the system may simply include the modifier unchanged. If they are different, then the modifiers might be mixed or bred in a manner similar to that described the above. For example, the modifier for Alicia and Bob's speed might be averaged (clamp between −5 and 47.5 MPH) or resampled in any other way. Modifiers might also be mutated in manners similar to that described above.

In some embodiments, when two code sets are mixed or bred as part of evolving 140, or elsewhere, a portion of each is used, resulting in a "whole" or 100% code. For example, in a particular instance, the system may use 40% of Alicia's code and 60% of Bob's, resulting in a 100% or whole code. In some embodiments, the resulting code may be constructed based on more (or less) than 100% combined. For example, the system may use a combined 110% (70% Alicia and 40% Bob), or more, of the candidate code sets. Using more than 100% combined code may be advantageous when the evolutionary aspects of the mutation might remove portions of the context and/or action, remove a link between the context and the action, and/or make part of the context invalid. For example, the mutation might remove the indication of LL, or Left Lane, from the context. If it turns out that the removed portion of the context is actually needed for proper performance, it could be useful for there to be a way to reintroduce elements, such as using more than 100% combined of the candidate code sets. Generally, combining together more than 100% of two candidate code sets, might be implemented as a Boolean "OR" of the two code sets in order to maintain any pieces that are unique to each code, or possibly 80-100% of the Boolean OR of the two trees. Further, in some embodiments, it will be useful to keep all of both sets of each code, notwithstanding that there could be some duplication of context variables.

As discussed elsewhere herein, labels may be related in a hierarchical relationship. In some embodiments, hierarchical labels can help used to evolve 140 code sets by filling gaps in code where some of the hierarchy of labels is present in the code and other parts of the hierarchy are not. Returning to the mailcart example, if #hardleft and #slowleft are sublabels of #turnleft, and code has only labels #turnleft, then the techniques herein may use that information to match or add code to fill out those missing sublabels. For example, if the first candidate code has #leftturn and #slowleft, and the second candidate code has #leftturn and #hardleft, then the compatibility score may be high (and the code may later be evolved 140) in order for the evolved 140 code to have all of the hierarchy #leftturn, #slowleft, and #hardleft.

After evolving 140 the first and second code to produce the third code, a check is made whether there is more 150 code to evolve. If there is, process 100 returns to 110, if no, then the process 100 is done 160 evolving code.

Evolving Programs Utilizing Context Indications

Figure 2A:
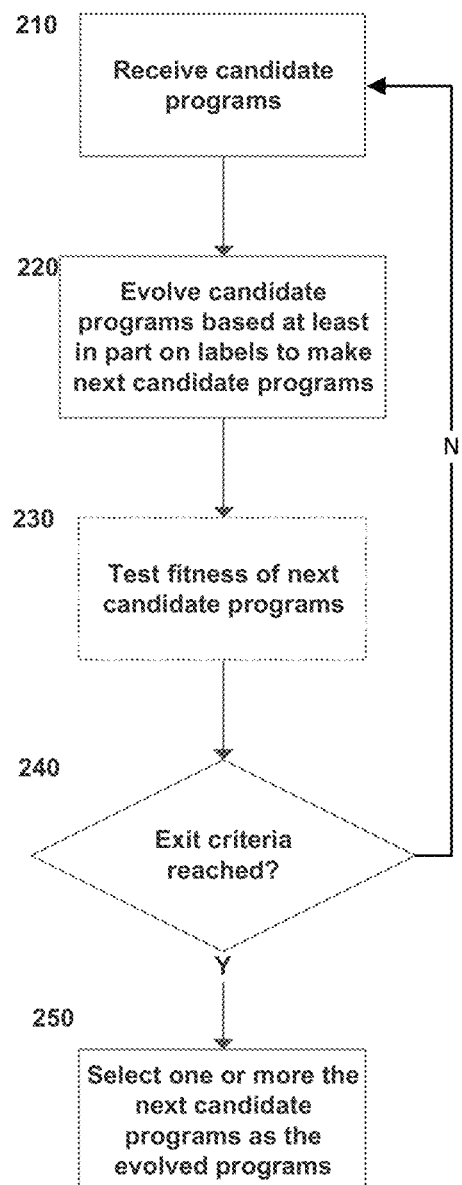
FIG. 2A and FIG. 2B are flow diagrams depicting example processes for evolving programs utilizing context indications.
Figure 2B:
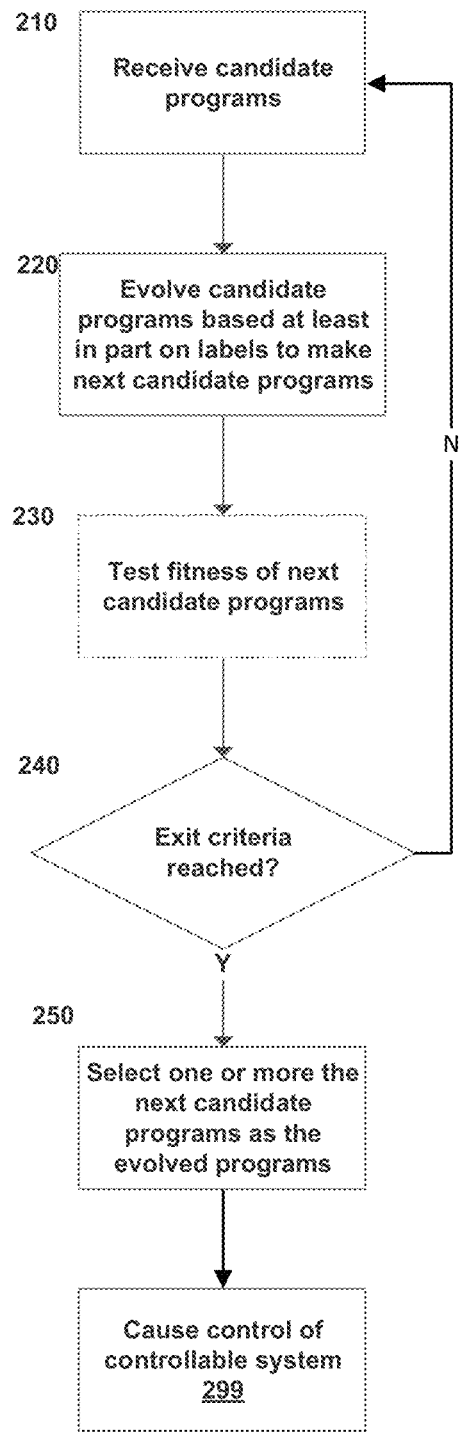

FIG. 2A and FIG. 2B depict processes 200 and 201 for evolving programs utilizing context indications. Candidate programs are received 210, and evolved 220 based at least in part on labels within the candidate code. The evolution 220 of the code produces candidate programs. The fitness of the evolved programs can be optionally tested 230. If exit criteria (e.g., fitness or some other measure or standard) are reached 240, then one or more candidate programs are selected 250. Otherwise, the process 200 or 201 returns to receive 210 more candidate programs.

Candidate programs are received 210 in process 200. The receipt 210 of candidate program may entail selecting a candidate program from storage 330 or 340 by evolution control engine 310, receipt at evolution control engine 310 (or other system, device, or process) over a network 390 (e.g., by downloading code from the Internet, receiving code sent or submitted by a submitter—not pictured in FIG. 3A and FIG. 3B), and the like. The received 210 candidate programs may perform the same or similar function. For example, the candidate programs received may be two versions of a mailcart program discussed in examples herein.

The received 210 programs can either or both be executable code and/or data. For example, the received 210 candidate programs could be set of context-action pairs representing actions taken in certain contexts, produced by one or more trainers. The received 210 programs could also be executable programs, such as an executable mailcart control engine. Further, the received 210 programs could be a combination of the training sets of context-action pairs and executable programs to control the execution of a self-driving mailcart. Various code within the received 210 programs may be labeled. Labels on code are discussed extensively herein. The labels used on code in one received program may or may not overlap with the labels in a second received program. Further, identical or similar labels may be used in multiple received 210 programs.

The received 210 candidate programs are evolved 220 based at least in part on labels, and the result is other or "next" candidate programs. Examples of evolving candidate programs are discussed with respect to FIG. 1, process 100, and elsewhere herein. As an example, evolution control engine 310 may receive 210 candidate programs to evolve 220. The evolved 220 or "next" candidate programs may be stored in memory associated with evolution control engine 310 and/or other storage 330, 340, or another device, process, system, or engine 320.

In some embodiments, after the candidate programs are evolved 220, resulting in next candidate programs, they might be tested for fitness 230. Testing a program for fitness 230 is optional and may not be done in all embodiments. In some embodiments, testing a program for fitness 230 can vary by the domain of the candidate programs and can be a measure of performance of the candidate programs as compared to other candidate programs. Testing for fitness may include calculating a fitness score for a candidate program. For example, a fitness function may be a measure of the speed, processing efficiency, or some other measure of performance. Further, a fitness score might be modified at random, to introduce additional variation. A fitness score may also be calculated based in part on fitness scores of "parent" candidate program. For example, if a set of evolved context-action pairs has parent sets of context-action pairs A', A" and B', B" going back two "generations", then the fitness score may be a function of the current set of context-action pairs fitness and the fitness scores of A', A", B', and B". Further, the effect or contribution of the patents' and other ancestor fitness scores may phase out over time. For example, in some embodiments, the parents' fitness score may be multiplied by a coefficient less than one and added to the current fitness score multiplied by one minus the first coefficient. Since the scores from the generation(s) before the parents would have also been included in the parents' scores and multiplied by a coefficient less than one, those scores would be further reduced in impact in the current and each subsequent generation. An example equation would be $Score[i]=(1-B)*Fitness[i]+B*Sum_j(Scores[i-1,j])$, where Fitness[i] is the current fitness score, $0<B<1$, and Score[i-1,j] is the (j) parents' scores. Additionally, if a candidate set of context-action pairs remains or is otherwise a candidate for more than one generation, its own fitness score from previous generations may also be used in addition to its fitness score from the current generation. For example, a current fitness score may be a weighted sum of the fitness score from the current generation and the fitness score from the previous generation, such as 0.5*current_generation_fitness+0.5*previous_generation_fitness. For example, in the example of the mailcart program above, the fitness function may be a function of one or more of travel time, smoothness of ride, whether there were any accidents or errors, etc.

If exit criteria are reached 240, then the evolved 220 candidate programs may be selected 250. Selecting 250 a program may include or be associated with indicating that the candidate program can be used in production, as part of a self-driving car reasoning engine, simulator, game, program. Further, after selection 250 of the candidate program, it may be further tested or evolved by techniques herein or other means, etc.

As apparent from the description herein, the techniques can be applied to code merging in scenarios far more complex than typically achievable by known revision control techniques. Imagine you had 3 or more development teams (led by Alicia, Bob, and Charles) and told them to all write code that did the same thing, and that they just had to annotate their code with the respective labels. With traditional branching and merging, this would be impossible and/or the results would be non-functional. However, using the techniques herein the multiple code sets could be evolved to produce better (more fit) code than any one of the teams.

In FIG. 2B, process 201 largely parallels process 200 of FIG. 2A with similar figure numbers indicating similar features of the process. In FIG. 2B, embodiments may also include causing 299 control of a controllable system.

Numerous embodiments of controllable systems are described extensively herein and include self-driving cars, image labelling systems, health decision making systems, manufacturing systems, smart voice control systems, federated systems, cybersecurity systems, etc. Controlling such systems is described extensively elsewhere herein.

Figure 3A:
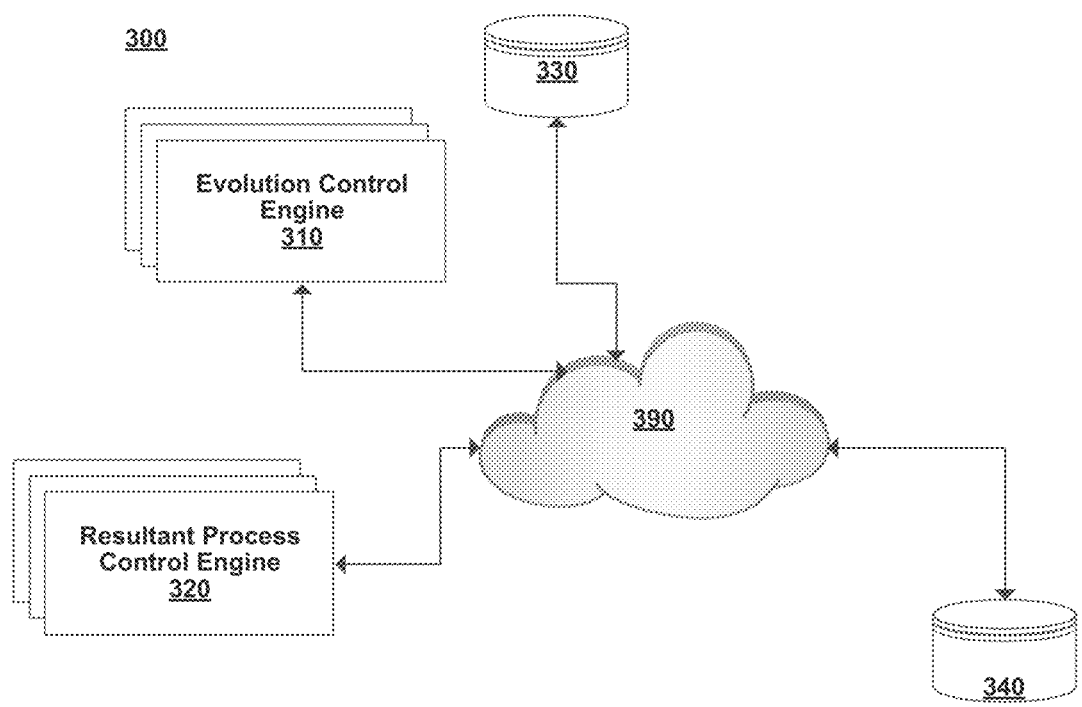
FIG. 3A and FIG. 3B depict example systems for evolutionary programming techniques utilizing context indications.
Figure 3B:
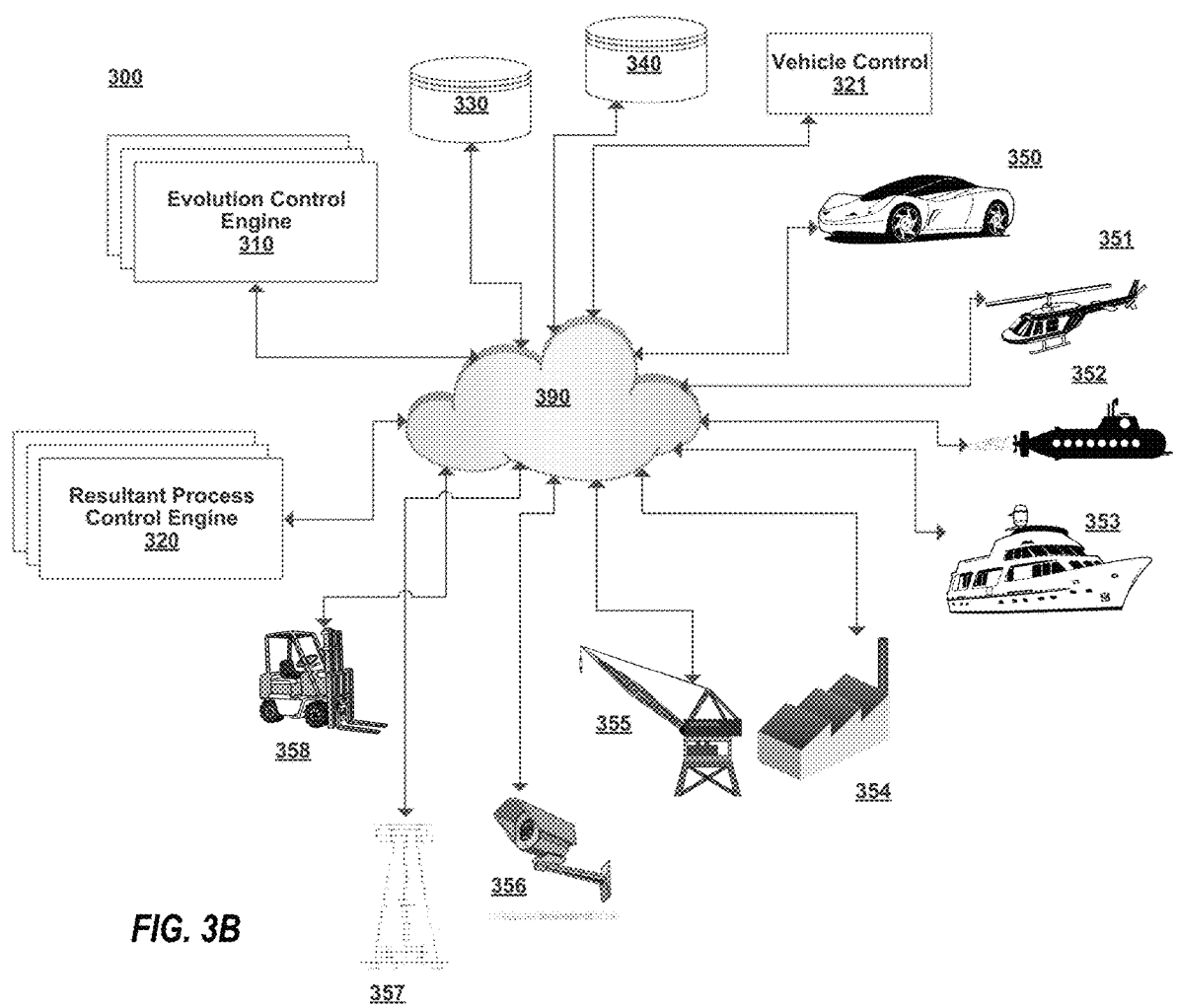

Example System for Evolutionary Programming Techniques Utilizing Context Indications FIG. 3A and FIG. 3B depict example systems for evolutionary programming techniques utilizing context indications. System 300 includes elements connected by a communicative coupling or network 390. Examples of communicative coupling and networks are described elsewhere herein. In some embodiments, the processes 100, 200, and 201 of FIG. 1, FIG. 2A, and FIG. 2B may run on the system 300 of FIG. 3A and/or FIG. 3B and/or the hardware 400 of FIG. 4. For example, the described functions of process 100 and/or process 200 may be performed by evolution control engine 310 (and/or resultant process control engine 320). The selected, evolved programs might be stored at evolution control engine 310, resultant process control engine 320 and/or communicatively coupled storage 330 or 340. A resultant process control engine 320 may execute the candidate programs produced by processes 100 and/or 200.

Each of evolution control engine 310 and resultant process control engine 320 may run on a single computing device, multiple computing devices, in a distributed manner across a network, on one or more virtual machines, which themselves run on one or more computing devices. In some embodiments, evolution control engine 310 and resultant process control engine 320 are distinct sets of processes running on distinct sets of computing devices. In other embodiments, evolution control engine 310 and resultant process control engine 320 are intertwined or share processes or functions and/or run on the same computing devices. In some embodiments, storage 330 and 340 are communicatively coupled to evolution control engine 310 and resultant process control engine 320 via a network 390 or other connection. Storage 330 and 340 may also be part of or integrated with evolution control engine 310 and/or resultant process control engine 320 via a network 390 or other connection.

System 300 in FIG. 3B includes a training and analysis system 310 coupled to network 390. The training and analysis system 310 may be used for collecting data related to systems 350-358 and creating computer based reasoning models based on the training of those systems. Further, training and analysis system 310 may perform aspects of processes 100 and/or 400 described herein. Control engine 320 is also coupled to network 390. A control engine 320 may control various of the systems 350-358. For example, a vehicle control 321 may control any of the vehicles 350-353, or the like. In some embodiments, there may be one or more network attached storages 330, 340. These storages 330, 340 may store training data, computer-based reasoning models, updated computer-based reasoning models, and the like. In some embodiments, training and analysis system 310 and/or control engine 320 may store any needed data including computer-based reasoning models locally on the system. FIG. 3B depicts numerous systems 350-358 that may be controlled by a control engine 320 or 321. For example, automobile 350, helicopter 351, submarine 352, boat 353, factory equipment 354, construction equipment 355, security equipment 356, oil pump 357, or warehouse equipment 358 may be controlled by a control engine 320 or 321.

As discussed herein the various processes 100, 200, etc. may run in parallel, in conjunction, together, or one process may be a subprocess of another. Further, any of the processes may run on the systems or hardware discussed herein.

Overview of Surprisal, Entropy, and Divergence

Below is a brief summary of some concepts discussed herein. It will be appreciated that there are numerous ways to compute the concepts below, and that other, similar mathematical concepts can be used with the techniques discussed herein.

Entropy ("H(x)") is a measure of the average expected value of information from an event and is often calculated as the sum over observations of the probability of each observation multiple by the negative log of the probability of the observation.

$$H(x) = -\Sigma_i p(x_i) * \log p(x_i)$$

Entropy is generally considered a measure of disorder. Therefore, higher values of entropy represent less regularly ordered information, with random noise having high entropy, and lower values of entropy represent more ordered information, with a long sequence of zeros having low entropy. If $\log_2$ is used, then entropy may be seen as representing the theoretical lower bound on the number of bits needed to represent the information in a set of observations. Entropy can also be seen as how much a new observation distorts a combined probability density or mass function of the observed space. Consider, for example, a universe of observations where there is a certain probability that each of A, B, or C occurs, and a probability that something other than A, B, or C occurs.

Surprisal ("I(x)") is a measure of how much information is provided by a new event $x_i$.

$$I(x_i) = -\log p(x_i)$$

Surprisal is generally a measure of surprise (or new information) generated by an event. The smaller the probability of $X_i$, the higher the surprisal.

Kullback-Leibler Divergence ("KL divergence" or "$\text{Div}_{KL}(x)$") is a measure of difference in information between two sets of observation. It is often represented as $$\text{Div}_{KL}(x) = \Sigma_i p(x_i) * (\log p(x_i) - \log q(x_i)),$$

where $p(x_i)$ is the probability of $x_i$ after $x_i$ has occurred, and $q(x_i)$ is the probability of $x_i$ before $x_i$ has occurred.

Familiarity Conviction Examples

Conviction and contribution measures may be used with the techniques herein. In some embodiments, conviction measures may be related in various ways to surprisal, including conviction being related to the ratio of observed surprisal to expected surprisal. Various of the conviction and contribution measures are discussed herein, including familiarity conviction discussed next.

In some embodiments, it may be useful to employ conviction as measure of how much information the point distorts the model. To do so, one may define a feature information measure, such as familiarity conviction, such that a point's weighted distance contribution affects other points' distance contribution and compared to the expected distance contribution of adding any new point.

Definition 1. Given a point x∈X and the set K of its k nearest neighbors, a distance function d: $R^z \times Z \to R$, and a distance exponent α, the distance contribution of x may be the harmonic mean $$\phi(x) = \left(\frac{1}{|K|} \sum_{k \in K} \frac{1}{d(x,k)^\alpha}\right)^{-1}. \tag{3}$$

Definition 2. Given a set of points $X \subset R^z$ for every $x \in X$ and an integer $1 \le k < |X|$ one may define the distance contribution probability distribution, C of X to be the set $$C = \left\{\frac{\phi(x_1)}{\sum_{i=1}^n \phi(x_i)}, \frac{\phi(x_2)}{\sum_{i=1}^n \phi(x_i)}, \ldots, \frac{\phi(x_n)}{\sum_{i=1}^n \phi(x_i)}\right\} \tag{4}$$

for a function φ: X→R that returns the distance contribution.

Note that if φ(0)=∞, special consideration may be given to multiple identical points, such as splitting the distance contribution among those points.

Remark 1. C may be a valid probability distribution. In some embodiments, this fact is used to compute the amount of information in C.

Definition 3. The point probability of a point $x_i$, i=1, 2, . . . , n may be $$l(i) = \frac{\phi(x_i)}{\sum_i \phi(x_i)} \tag{5}$$

where the index i is assigned the probability of the indexed point's distance contribution. One may denote this random variable L.

Remark 2. When points are selected uniformly at random, one may assume L is uniform when the distance probabilities have no trend or correlation.

Definition 4. The conviction of a point $x_i \in X$ may be $$\pi_f(x_i) = \frac{\frac{1}{|X|}\sum_i \mathbb{KL}(L \| L - \{i\} \cup \mathbb{E}l(i))}{\mathbb{KL}(L \| L - \{x\} \cup \mathbb{E}l(i))} \tag{6}$$

where KL is the Kullback-Leibler divergence. In some embodiments when one assumes L is uniform, one may have that the expected probability $$\mathbb{E}l(i) = \frac{1}{n}.$$

Prediction Conviction Examples

In some embodiments, it is useful to employ conviction as a proxy for accuracy of a prediction. To do so, one may define another type of conviction such that a point's weighted distance to other points is of primary importance and can be expressed as the information required to describe the position of the point in question relative to existing points.

Definition 5. Let F be the number of features in a model and n the number of observations. One may define the residual function of the training data X:

$$r:X \to R^\xi$$

$$r(x) = J_1(k,p), J_2(k,p), \ldots, J_\xi(k,p) \tag{7}$$

Where $J_i$ may be the residual of the model on feature i parameterized by the hyperparameters k and p evaluated on points near x. In some embodiments, one may refer to the residual function evaluated on all of the model data as $r_M$. In some embodiments, the feature residuals may be calculated as mean absolute error or standard deviation.

In some embodiments, one can quantify the information needed to express a distance contribution φ(x) by moving to a probability. In some embodiments, the exponential distribution may be selected to describe the distribution of residuals, as it may be the maximum entropy distribution constrained by the first moment. In some embodiments, a different distribution may be used for the residuals, such as the Laplace, lognormal distribution, Gaussian distribution, normal distribution, etc.

The exponential distribution may be represented or expressed as:

$$\frac{1}{\lambda} = \|r(x)\|_p \tag{8}$$

We can directly compare the distance contribution and p-normed magnitude of the residual. This is because the distance contribution is a locally weighted expected value of the distance from one point to its nearest neighbors, and the residual is an expected distance between a point and the nearest neighbors that are part of the model. Given the entropy maximizing assumption of the exponential distribution of the distances, we can then determine the probability that a distance contribution is greater than or equal to the magnitude of the residual as:

$$P(\phi(x) \ge \|r(x)\| \setminus do5(_p)) = e \setminus s \setminus up5(-\setminus F(1, \|r(x)\| \setminus s \setminus do4(p)) \cdot (p(x)). \tag{9}$$

We then convert the probability to self-information as:

$$I(x) = -\ln P(\phi(x) \ge \|r(x)\| \setminus s \setminus do5(_p)) \setminus, \tag{10}$$

which simplifies to:

$$I(x) = \setminus F(\phi(x), \|r(x)\| \setminus s \setminus do5(_p)). \tag{11}$$

As the distance contribution decreases, or as the residual vector magnitude increases, the less information may be needed to represent this point. One can then compare this to the expected value a regular conviction form, yielding a prediction conviction of:

$$p) = \setminus F(EI, I(x)) \setminus, \tag{12} \pi \setminus s \setminus do5($$

where I is the self-information calculated for each point in the model.

Feature Prediction Contribution Examples

In some embodiments, another feature information measure, Feature Prediction Contribution, may be related Mean Decrease in Accuracy (MDA). In MDA scores are established for models with all the features M and models with each feature held out $M_{-f_i}$, i=1 . . . ξ. The difference $|M - M_{-f_i}|$ is the importance of each feature, where the result's sign is altered depending on whether the goal is to maximize or minimize score.

In some embodiments, prediction information c) is correlated with accuracy and thus may be used as a surrogate. The expected self-information required to express a feature is given by: $\pi\s\do5($ $$EI(M)=\F(1,\xi)\i\su(i,\xi,)I(x\s\do5(i))\,$$

and the expected self-information to express a feature without feature i is

\mathbb{E} \sum_{j=0}^\xiI_{-i}(x_j).
I(M_{-i})=\frac{1}{\xi}
\end{equation*}"

$$EI(M\s\do5(_{-i}))=\F(1,\xi)\i\su(j=0,\xi,)I\s\do5(_{-i})(x\s\do5(_j)).$$

One can now make two definitions:

Definition 6. The prediction contribution of feature i is c)(i)=\F(M−M\s\do5($_{-f\s\do4(i)}$),M).π\s\do5( Definition 7. The prediction conviction, of feature i is p)(i)=\F(\F(1,ξ)\i\su(i=0,ξ,)M\s\do5($_{-f\s\do4(i)}$),M\s\do5($_{-f\s\do4(i)}$)).π\s\do5( Targeted and Untargeted Techniques for Determining Conviction and Other Measures In some embodiments, any of the feature information measures, conviction or contribution measures (e.g., surprisal, prediction conviction, familiarity conviction, and/or feature prediction contribution and/or feature prediction conviction) may be determined using an "untargeted" and/or a "targeted" approach. In the untargeted approach, the measure (e.g., a conviction measure) is determined by holding out the item in question and then measuring information gain associated with putting the item back into the model. Various examples of this are discussed herein. For example, to measure the untargeted conviction of a case (or feature), the conviction is measured in part based on taking the case (or feature) out of the model, and then measuring the information associated with adding the case (or feature) back into the model.

In order to determine a targeted measure, such as surprisal, conviction, or contribution of a data element (e.g., a case or a feature), in contrast to untargeted measures, everything is dropped from the model except the features or cases being analyzed (the "analyzed data element(s)") and the target features or cases ("target data element(s)"). Then the measure is calculated by measure the conviction, information gain, contribution, etc. based on how well the analyzed data element(s) predict the target data element(s) in the absence of the rest of the model.

In each instance that a measure, such as a surprisal, conviction, contribution, etc. measure, is discussed herein, the measure may be determined using either a targeted approach or an untargeted approach. For example, when the term "conviction" is used, it may refer to targeted or untargeted prediction conviction, targeted or untargeted familiarity conviction, and/or targeted or untargeted feature prediction conviction. Similarly, when surprisal, information, and/or contribution measures are discussed without reference to either targeted or untargeted calculation techniques, then reference may be being made to either a targeted or untargeted calculation for the measure.

Example Processes for Synthetic Data Generation

In some embodiments, the techniques discussed herein include synthetic data generation. The synthetic data generation may be performed before, after, or during any of the other techniques described herein. Similarly, the synthetic data generation may be performed for any technology area, such as those discussed herein, including but not limited to self-driving vehicles data, image labeling data, manufacturing data, smart home data, and the like.

In some embodiments, the techniques herein include receiving a request for synthetic training data. For example, a system or system operator may request additional or different training data in order to train a computer-based reasoning system that will be used to control a controllable system. In some cases, the controllable system or operator may request anonymous data that is similar to a current training data set (or different from, but still anonymized). In other cases, the system or operator may require more data than is in the current training data set, and therefore may request additional data to augment the current training data set. In some cases, synthetic data may be requested to direct sampling via a reinforcement learning process. The synthesized data (perhaps combined with original training data or by itself) may be used as part of a computer-based reasoning system to cause control of a system. Many controllable systems can be can be controlled with the techniques herein, such as controllable machinery, autonomous vehicles, lab equipment, etc. In some embodiments, the request for synthetic data may include a target surprisal for the target data. In some embodiments, if low target surprisal is requested, then the synthetic data may be close to and not differ much from existing data. If high target surprisal is requested, then the generated synthetic data may differ much from the existing data. In some embodiments, optionally, the received request for synthetic data may also include one or more conditions for the synthetic data. These conditions may be restrictions on the generated synthetic data. For example, if the synthetic data being generated is for a checkers game, a condition on the data may be that includes only moves that are part of a winning strategy, that survive for at least S moves without losing, and/or win within W moves. Another set of conditions on the synthetic training data may be a particular board layout (e.g., the starting checkers game state, the current checkers game state), etc.

When the received request includes one or more conditions for the synthetic data, the closest cases to the conditions may be determined as focal cases. In some embodiments, the closest cases to the conditions may be determined as the K nearest neighbors (KNN) for the conditions (e.g., the K cases that are "closest" to meeting the conditions). For example, if there are two features that have conditions, A and B, and the conditions are A=3 and B=5, then the KNN for the conditions would be those cases that are closest to meeting the conditions of A=3 and B=5. In some instances, if there are more than K cases that fully meet the condition (e.g., there are more than K cases that have feature values of A=3 and B=5, which scenario will be more common if the conditions are on features which are nominal or categorical), then K cases may be selected from those cases meeting the condition. These K cases may be selected from among those that fully meet the conditions can be done randomly, or using any appropriate technique, such as by looking at the surprisal and/or conviction of those cases and choosing the K with the highest (or lowest) surprisal, or all of the K cases may be used. In order to determine what K cases are "closest" any distance measurements discussed herein may be used, including Euclidean distance, Minkowski distance, Damerau-Levenshtein distance, Kullback-Leibler divergence, 1-Kronecker delta, and/or any other distance measure, metric, pseudometric, premetric, index, etc.

The conditions may be any appropriate single, multiple, and/or combination of conditions. For example, individual values may be given for features (e.g., A=5 and B=3); ranges may be given (e.g., A>=5 and B<4); multiple values may be given (e.g., E="cat", "dog", or "horse"); one or more combination can be given (e.g., [(A>1 and B<99) or (A=7 and E="horse")]).

The values for the conditioned features of the synthesized case may be set or determined based on the corresponding values for the features in the focal cases (e.g., determined as the KNN of the conditions, as described above). For example, for each conditioned feature, the mean, mode, an interpolated or extrapolated value, most-often occurring value of the corresponding feature from among the focal cases may be chosen as the value for the feature in the synthetic data case. In some embodiments, the distribution of the values of the conditioned features in the focal cases may be calculated and a value may be chosen based on that distribution, which may include the maximum likelihood value, selection via random sampling, inverse distance weighting, kernel functions, or other function or learned metric. In some embodiments, the values for conditioned features are set to (or based on) the condition values (vs. the values for the conditioned feature in the focal cases as described above). For example, if the conditions are A=5 and B=3, then feature A may be set to the value 5 and feature B may be set to the value 3 regardless of the values of that feature in the focal cases.

When there are no conditions received with the request for synthetic data, a random case may be selected as a focal case or a set of random cases may be selected as the set of focal cases. When there are no conditions, then, in some embodiments, the techniques begin by selecting a random case, selecting the first feature, or a random feature, or the next feature prioritized by some metric, importance, conviction, or ranking, and select the value from the selected case as the value of the feature in the synthetic data value. Then, the techniques may proceed as described. For example, in some embodiments, the value for a first feature (e.g., A=12) is chosen from the chosen case and then the KNN are determined. The KNN may be the K cases that are closest to having that value (e.g., A=12) are chosen as the focal cases.

After the focal cases for the synthetic data have been determined (whether or not based on received conditions), then a first undetermined feature is selected. When there are no conditions, selecting the first undetermined feature comprises selecting one of the features from the randomly-selected case that was not previously determined. When there are conditions on the synthetic data, then the conditioned features are first set based on the conditions and the focal cases that are KNN of the condition (as described elsewhere herein). After the first feature(s) have been determined (whether or not there are conditions), then the next (undetermined) feature may be selected. Selecting which undetermined feature to determine next can be done in any appropriate manner, such as selecting randomly among the remaining undetermined features, choosing the feature with the highest or lowest conviction, etc.

The distribution of values for the undetermined feature is then determined. For example, the distribution may be assumed to be log normal, Laplace, Gaussian, normal, or any other appropriate distribution, and be centered, e.g., on the computed undetermined feature value or on the median or mode of the values for the undetermined feature in the set of focal cases (or in the training data). The distribution for the feature can also be determined by parameterizing it via surprisal using the distribution's entropy. For example, if a distribution has an error, a, with the error modeled as a Gaussian distribution, and we know that the entropy of a sample from Gaussian distribution is $\frac{1}{2} \log(2\pi e \sigma^2)$, we can adjust the error parameter to match a specified level of surprisal for that feature when taking a sample of the feature as the synthesized value. Alternatively, surprisal may also be determined by measuring other types of information, such as Kullback-Leibler Divergence ("KL divergence" or "$Div_{KL}(x)$") or cross entropy, and a desired surprisal can be attained by adjusting the corresponding parameters for the distribution. Methods describing distance from a point as a probability can be used to map the surprisal to distance, and may include any relevant distribution. When synthesizing data for multiple features, each feature can be set to the same surprisal, or alternatively each feature can "use up" the surprisal for the synthetic data parameterizing each feature's distribution with its own amount of surprisal, treating total surprisal of the synthesized data as a budget or goal for all of the features together. Some features may be accorded more surprisal than others, and therefore may "use up" more of the surprisal budget. In cases where higher surprisal is desired, distributions will typically be wider. In situations where lower surprisal is desired, distributions will typically be narrower. The relative surprisal accorded each feature may be set or determined in any appropriate manner, including assigning the relative amount of surprisal randomly, having the relative amounts set by a human operator, and/or setting them based on a particular measure or metric, such as having the features with the lowest (or highest) surprisal in the training data being accorded more of the surprisal budget. Extensive additional discussion of these techniques are given elsewhere herein.

The value of for the undetermined feature for the synthetic case may then be determined based on the determined distribution. Determining the value based on the determined distribution comprises selecting a value (or sampling) randomly based on a random number and the determined distribution. In some embodiments, this is performed via inverse transform sampling. In some embodiments, the distribution does not have a closed form solution to translate a uniformly chosen random number to a random number from the parameterized distribution, and techniques to generate the required random number include rejection sampling, the Box-Muller transform, and the Ziggurat algorithm. In some embodiments, the techniques may continue to determine values for features until there are no more undetermined features. In order to determine values for each subsequent undetermined feature in the synthetic data case, the already-determined feature values are used to determine the K nearest neighbors (a new set of focal cases) to that set of already-determined values (e.g., all of the feature values set to that point). For example, if values A=3, B=5, and C=9.7 have already been set for the synthetic data case, either via conditioning or based on synthetic data generation (and value D is next to be determined), then the K nearest neighbors to the values for A, B, and C will be the new set of focal cases. Then the distribution (e.g., DistD) for that subsequent undetermined feature (e.g., feature D) is determined for the new set of focal cases. A value for the subsequent undetermined feature (e.g., D) is the determined based on a random sampling of the distribution (e.g., DistD) determined for that feature. When all of the feature values have been determined, then the synthetic data case is complete.

In some embodiments, optionally, the synthetic data case can be tested for fitness. Testing the synthetic data case for fitness can include any appropriate technique, including confirming that the synthetic data case meets any received conditions, or whether it meets other criteria, such as a fitness score or function. The fitness score or function may be any appropriate function. In some embodiments, the fitness function depends on the domain of the synthetic data case and can be a measure of performance of the synthetic data case as compared to other data cases. For example, the fitness function may be a measure of speed, processing efficiency, or some other measure of performance. Further, the fitness function might be modified at random, to introduce additional variation.

Upon completion of the synthetic data case, optionally, it can be provided or used as synthetic data. For example, the synthetic data case may be provided in response to the received request for synthetic data. In some embodiments, multiple synthetic data cases may be created in response to receiving the original request, and may be provided in response to that request. Providing the synthetic data case(s) in response to the request can take any appropriate form, including having them sent via HTTP, HTTPS, FTP, FTPS, via an API, a remote procedure call, a function or procedure call, etc., and/or in response to one of the foregoing.

In some embodiments, optionally, after one or more synthetic data cases have been created, control of a controllable system can be caused based at least in part on the synthetic data case(s) created using techniques herein. For example, a computer-based reasoning model may be trained based on the synthetic data case(s) and that model may be used to control a controllable system. Numerous examples of causing control of a controllable system are discussed herein and include, manufacturing control, vehicle control, image labelling control, smart device control, federated system control, etc.

Parameterizing Synthetic Data Via Prediction Conviction Examples

As discussed elsewhere, various embodiments use the double-sided exponential distribution as a maximum entropy distribution of distance in Lp space. One may then be able to derive a closed form solution for how to scale the exponential distributions based on a prediction conviction value. For example, a value, v, for the prediction conviction may be expressed as $$p)(x) = \backslash F(EI, I(x)) \qquad (13) v = \pi \backslash s \backslash do 5 ($$

which may be rearranged as
\backslash I(x)=\backslash frac\{\backslash mathbb\{E\} I\}\{\backslash nu\}.
\backslash end\{equation\}"

$$I(x) = \backslash F(EI, v). \qquad (14)$$

Substituting in the self-information described elsewhere herein:
\backslash label\{eq:datagen\_exponential\_equality\}
\backslash frac\{\backslash phi(x)\}\{\|r(x)\|\_p\}=\backslash frac\{\backslash mathbb\{E\} I\}\{\backslash nu\}.
\backslash end\{equation\}"

$$x), \|r(x)\| \backslash s \backslash do5(_p)) = \backslash F(EI, v). \qquad (15) \backslash F(\varphi($$

In some embodiments, that the units on both sides of Equation 15 match. This may be the case in circumstances where he natural logarithm and exponential in the derivation of Equation 15 cancel out, but leave the resultant in nats. We can rearrange in terms of distance contribution as:
\backslash phi(x)=\backslash frac\{\|r(x)\|\_p \backslash cdot \backslash mathbb\{E\} I\}\{\backslash nu\}.
\backslash end\{equation\}"

$$x) = \backslash F(\|r(x)\| \backslash s \backslash do5(_p) \cdot EI, v). \qquad (16)\varphi($$

If we let p=0, which may be desirable for conviction and other aspects of the similarity measure, then we can rewrite the distance contribution in terms of its parameter, with expected mean of. This becomes
\backslash Pi\_i \backslash mathbb\{E\} (1/\backslash lambda\_i)=\backslash frac\{\backslash Pi\_i r\_i \backslash mathbb\{E\} I\}\{\backslash nu\}.
end\{equation\}"

$$i)E(1/\lambda \backslash s \backslash do5(_i)) = \backslash F(\Pi \backslash s \backslash do5(_i) r \backslash s \backslash do5(_i) EI, v). \qquad (17)\Pi \backslash s \backslash do5($$

In some embodiments, due to the number of ways surprisal may be assigned or calculated across the features, various solutions may exist. However, unless otherwise specified or conditioned, embodiments may include distributing surprisal uniformly across the features, holding expected proportionality constant. In some embodiments, the distance contribution may become the mean absolute error for the exponential distribution, such as:

$$E(1/\lambda \backslash s \backslash do5(_i)) = r \backslash s \backslash do5(_i) \backslash F(EI, v). \qquad (18)$$

and solving for the to parameterize the exponential distributions may result in:
\backslash label\{eq:datagen\_exponential\_parameter\}
\backslash lambda\_i=\backslash frac\{\backslash nu\}\{r\_i \backslash mathbb\{E\} I\}.
\backslash end\{equation\}"

$$i) = \backslash F(v, r \backslash s do5(_i) EI). \qquad (19) \lambda \backslash s \backslash do5($$

In some embodiments, Equation 19, when combined with the value of the feature, may become the distribution by which to generate a new random number under the maximum entropy assumption of exponentially distributed distance from the value.

Reinforcement Learning Examples

In some embodiments, the techniques can generate data with a controlled amount of surprisal, which may be a novel way to characterize the classic exploration versus exploitation trade off in searching for an optimal solution to a goal. Traditionally, pairing a means to search, such as Monte Carlo tree search, with a universal function approximator, such as neural networks, may solve difficult reinforcement learning problems without domain knowledge. Because the data synthesis techniques described herein utilize the universal function approximator model (kNN) itself, it enables the techniques to be use in a reinforcement learning architecture that is similar and tightly coupled, as described herein.

In some embodiments, setting the conviction of the data synthesis to "1" (or any other appropriate value) yields a balance between exploration and exploitation. Because, in some embodiments, the synthetic data generation techniques described herein can also be conditioned, the techniques may condition the search on both the current state of the system, as it is currently observed, and a set of goal values for features. In some embodiments, as the system is being trained, it can be continuously updated with the new training data. Once states are evaluated for their ultimate outcome, a new set of features or feature values can be added to all of the observations indicating the final scores or measures of outcomes (as described elsewhere herein, e.g., in relation to outcome features). Keeping track of which observations belong to which training sessions (e.g., games) may be beneficial as a convenient way to track and update this data.

In some embodiments, given that the final score or multiple goal metrics may already be in the kNN database, the synthetic data generation may allow querying for new data conditioned upon having a high score or winning conditions (or any other appropriate condition), with a specified amount of conviction.

In some embodiments, the techniques herein provide a reinforcement learning algorithm that can be queried for the relevant training data for every decision, as described elsewhere herein. The commonality among the similar cases, boundary cases, archetypes, etc. can be combined to find when certain decisions are likely to yield a positive outcome, negative outcome, or a larger amount of surprisal thus improving the quality of the model. In some embodiments, by seeking high surprisal moves, the system will improve the breadth of its observations.

Additional Reinforcement Learning and Other Embodiments

In some embodiments, the techniques may be used for reinforcement learning. For example, each time a synthetic training case is created, then the set of training cases can be updated and new synthetic data can be generated based on the updated set of training cases. In some embodiments, the techniques herein are used for reinforcement learning. For reinforcement learning, the outcome or goal feature(s) (e.g., the score of a game, or having a winning checkers match) are treated as conditioned inputs or features. For example, in the checkers example, the synthetic data case is generated with conditions of the current game board setup and where the move was part of a winning strategy. The "winning strategy" feature may have been set in the training data set. For example, once a game has been won, an outcome feature is set to either "winning" or "losing" for all moves that had been made in the game. As such, each move in a winning game has the outcome feature set to "winning" and each move in a losing game has outcome set to "losing." As such, then the data is conditioned to pick only moves that are part of a winning game, that feature (outcome="winning") is used in the KNN calculation discussed elsewhere herein.

The reinforcement learning scenarios can also include ranges (like a score above, below, or within a certain threshold), and other criteria. For example, as discussed elsewhere herein, the techniques herein can be useful in reinforcement learning situations where synthetic data is needed on expensive, dangerous, and/or hard to reproduce scenarios. For example, if pipelines only fail (e.g., leak, explode, become clogged) 0.001% of the time, but training data is needed to train a computer-based reasoning system to detect when those scenarios are going to happen, the techniques herein can be used to synthesize training data for those rare cases. This allows additional training data for pipeline failure to be gathered without incurring the difficulty, danger, and cost of actual pipeline failures. In such an example, the failure of the pipeline could be one of the conditions on the synthetic data. So, as data is being generated, the focal cases determined will be those associated with pipeline failure, and the subsequently-generated features will represent the distribution of values of those features within the conditioned data.

In some embodiments, the techniques may be used to create synthetic data that replicates users, devices, etc. For example, data that is based on, is similar to user data (or device data, etc.) can be created using the techniques herein. Consider user data that cannot be used (because it is not anonymous) and where one would prefer not to anonymize the data. That data can be used to create synthetic user data. If the data includes personally identifiable information as features (e.g., name, SSN, etc.), those features could be assigned random values, and the rest of the features can be synthesized based on user data (and possibly conditions) using the techniques discussed herein. Alternatively, in some embodiments, features containing personally-identifiable information could also be generated based on existing user data, but with very high surprisal, creating a much wider distribution than seen in the user data.

Example Processes for Controlling Systems

Figure 5:
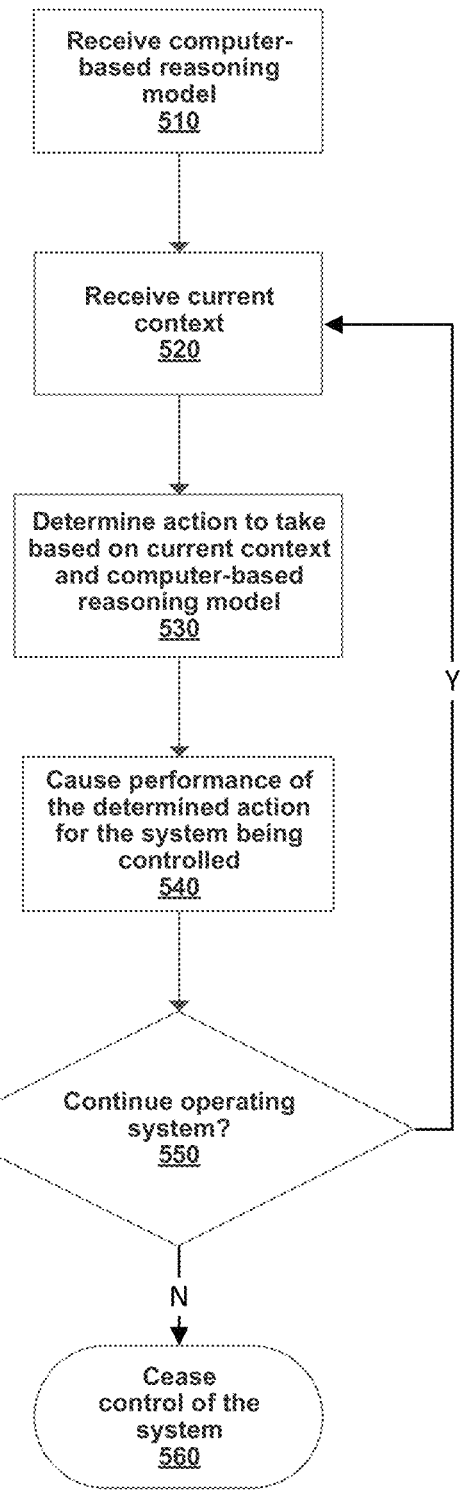
FIG. 5 is a flow diagram depicting example processes for controlling systems.

FIG. 5 depicts an example process 500 for controlling a system. In some embodiments and at a high level, the process 500 proceeds by receiving or receiving 510 a computer-based reasoning model for controlling the system. The computer-based reasoning model may be one created using processes 100, 200, or 201, as one example. In some embodiments, the process 500 proceeds by receiving 520 a current context for the system, determining 530 an action to take based on the current context and the computer-based reasoning model, and causing 540 performance of the determined action (e.g., labelling an image, causing a vehicle to perform the turn, lane change, waypoint navigation, etc.). If operation of the system continues 550, then the process returns to receive 520 the current context, and otherwise discontinues 560 control of the system. In some embodiments, causing 299 performance of a selected action may include causing 540 performance of a determined action (or vice-versa).

As discussed herein the various processes 100, 200, 201, 500, etc. may run in parallel, in conjunction, together, or one process may be a subprocess of another. Further, any of the processes may run on the systems or hardware discussed herein. The features and steps of processes 100, 200, 201, 500 could be used in combination and/or in different orders.

Example Cases, Data Elements, Contexts, and Operational Situations

In some embodiments, the cases or data elements may include context data and action data in context-action pairs. Various embodiments discussed herein may include any of the context data and actions associated with control of systems. For example, context data may include the state of machines and/or sensors in a manufacturing plant and the actions may include control of parts of the manufacturing system (e.g., speed of certain machinery, turning machinery on or off, signaling something for operator review, etc.). In some embodiments, cases may relate to control of a vehicle. For example, context data may include data related to the operation of the vehicle, including the environment in which it is operating, and the actions taken may be of any granularity. Consider an example of data collected while a driver, Alicia, drives around a city. The collected data could be context and action data where the actions taken can include high-level actions (e.g., drive to next intersection, exit the highway, take surface roads, etc.), mid-level actions (e.g., turn left, turn right, change lanes) and/or low-level actions (e.g., accelerate, decelerate, etc.). The contexts can include any information related to the vehicle (e.g. time until impact with closest object(s), speed, course heading, breaking distances, vehicle weight, etc.), the driver (pupillary dilation, heart rate, attentiveness, hand position, foot position, etc.), the environment (speed limit and other local rules of the road, weather, visibility, road surface information, both transient such as moisture level as well as more permanent, such as pavement levelness, existence of potholes, etc.), traffic (congestion, time to a waypoint, time to destination, availability of alternate routes, etc.), and the like. These input data (e.g., context-action pairs for training a context-based reasoning system or input training contexts with outcome actions for training a machine learning system) can be saved and later used to help control a compatible vehicle in a compatible operational situation. The operational situation of the vehicle may include any relevant data related to the operation of the vehicle. In some embodiments, the operational situation may relate to operation of vehicles by particular individuals, in particular geographies, at particular times, and in particular conditions. For example, the operational situation may refer to a particular driver (e.g., Alicia or Carole). Alicia may be considered a cautious car driver, and Carole a faster driver. As noted above, and in particular, when approaching a stop sign, Carole may coast in and then brake at the last moment, while Alicia may slow down earlier and roll in. As another example of an operational situation, Bob may be considered the "best pilot" for a fleet of helicopters, and therefore his context and actions may be used for controlling self-flying helicopters.

In some embodiments, the operational situation may relate to the locale in which the vehicle is operating. The locale may be a geographic area of any size or type, and may be determined by systems that utilize machine learning. For example, an operational situation may be "highway driving" while another is "side street driving". An operational situation may be related to an area, neighborhood, city, region, state, country, etc. For example, one operational situation may relate to driving in Raleigh, NC and another may be driving in Pittsburgh, PA. An operational situation may relate to safe or legal driving speeds. For example, one operational situation may be related to roads with forty-five miles per hour speed limits, and another may relate to turns with a recommended speed of 20 miles per hour. The operational situation may also include aspects of the environment such as road congestion, weather or road conditions, time of day, etc. The operational situation may also include passenger information, such as whether to hurry (e.g., drive faster), whether to drive smoothly, technique for approaching stop signs, red lights, other objects, what relative velocity to take turns, etc. The operational situation may also include cargo information, such as weight, hazardousness, value, fragility of the cargo, temperature sensitivity, handling instructions, etc.

In some embodiments, the context and action may include vehicle maintenance information. The context may include information for timing and/or wear-related information for individual or sets of components. For example, the context may include information on the timing and distance since the last change of each fluid, each belt, each tire (and possibly when each was rotated), the electrical system, interior and exterior materials (such as exterior paint, interior cushions, passenger entertainment systems, etc.), communication systems, sensors (such as speed sensors, tire pressure monitors, fuel gauges, compasses, global positioning systems (GPS), RADARs, LiDARs, cameras, barometers, thermal sensors, accelerometers, strain gauges, noise/sound measurement systems, etc.), the engine(s), structural components of the vehicle (wings, blades, struts, shocks, frame, hull, etc.), and the like. The action taken may include inspection, preventative maintenance, and/or a failure of any of these components. As discussed elsewhere herein, having context and actions related to maintenance may allow the techniques to predict when issues will occur with future vehicles and/or suggest maintenance. For example, the context of an automobile may include the distance traveled since the timing belt was last replaced. The action associated with the context may include inspection, preventative replacement, and/or failure of the timing belt. Further, as described elsewhere herein, the contexts and actions may be collected for multiple operators and/or vehicles. As such, the timing of inspection, preventative maintenance and/or failure for multiple automobiles may be determined and later used for predictions and messaging.

Causing performance of an identified action can include sending a signal to a real car, to a simulator of a car, to a system or device in communication with either, etc. Further, the action to be caused can be simulated/predicted without showing graphics, etc. For example, the techniques might cause performance of actions in the manner that includes, determining what action would be take, and determining whether that result would be anomalous, and performing the techniques herein based on the determination that such state would be anomalous based on that determination, all without actually generating the graphics and other characteristics needed for displaying the results needed in a graphical simulator (e.g., a graphical simulator might be similar to a computer game).

Numerous other examples of cases, data, contexts and actions are discussed herein.

Example Control Hierarchies

Figure 4:
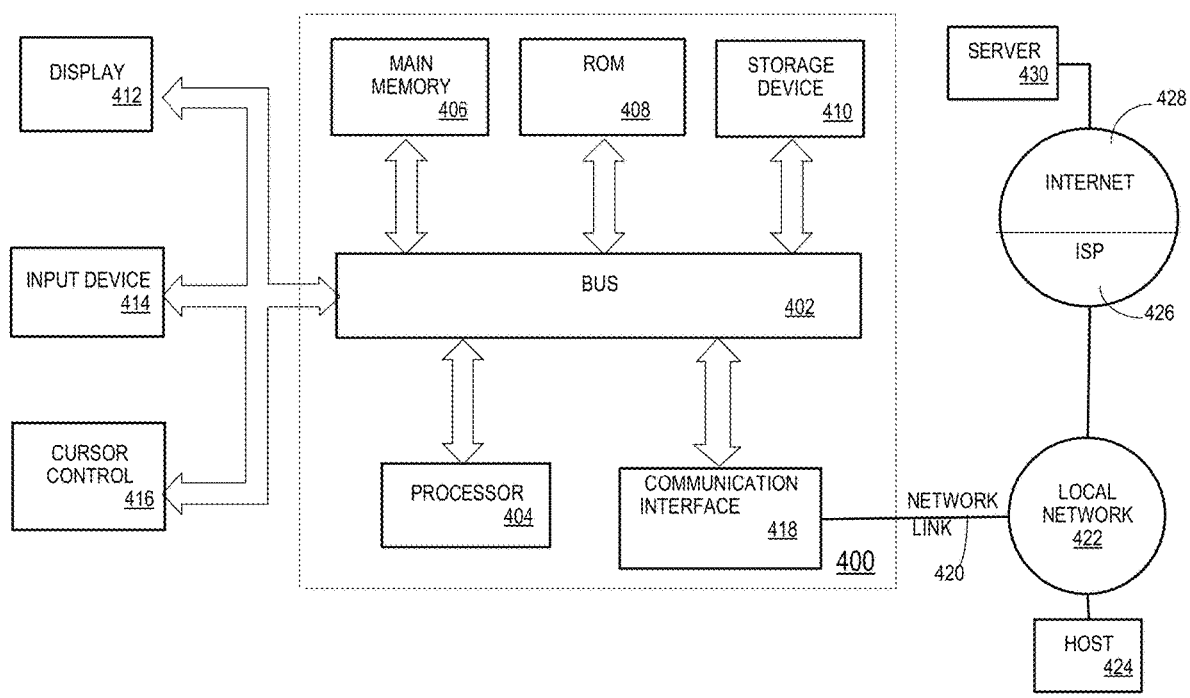
FIG. 4 depicts examples systems and hardware for evolutionary programming techniques utilizing context indications.

In some embodiments, the technique herein may use a control hierarchy to control systems and/or cause actions to be taken (e.g., as part of causing 299 control or performance 440 in FIG. 2B and FIG. 4). There are numerous example control hierarchies and many types of systems to control, and hierarchy for vehicle control is presented below. In some embodiments, only a portion of this control hierarchy is used. It is also possible to add levels to (or remove levels from) the control hierarchy.

An example control hierarchy for controlling a vehicle could be:
Primitive Layer—Active vehicle abilities (accelerate, decelerate), lateral, elevation, and orientation movements to control basic vehicle navigation
Behavior Layer—Programmed vehicle behaviors which prioritize received actions and directives and prioritize the behaviors in the action.
Unit Layer—Receives orders from command layer, issues moves/directives to the behavior layer.
Command Layers (hierarchical)—Receives orders and gives orders to elements under its command, which may be another command layer or unit layer.

Self-Driving Vehicles

Returning to the top of the process 500, it begins by receiving 510 a computer-based reasoning model for controlling the system. The computer-based reasoning model may be received in any appropriate matter. It may be provided via a network 390, placed in a shared or accessible memory on either the evolution control engine 310 or control engine 320, or in accessible storage, such as storage 330 or 340.

In some embodiments (not depicted in FIG. 5), an operational situation could be indicated for the system. The operational situation is related to context, but may be considered a higher level, and may not change (or change less frequently) during operation of the system. For example, in the context of control of a vehicle, the operational situation may be indicated by a passenger or operator of the vehicle, by a configuration file, a setting, and/or the like. For example, a passenger Alicia may select "drive like Alicia" in order to have the vehicle driver like her. As another example, a fleet of helicopters may have a configuration file set to operate like Bob. In some embodiments, the operational situation may be detected. For example, the vehicle may detect that it is operating in a particular location (area, city, region, state, or country), time of day, weather condition, etc. and the vehicle may be indicated to drive in a manner appropriate for that operational situation.

The operational situation, whether detected, indicated by passenger, etc., may be changed during operation of the vehicle. For example, a passenger may first indicate that she would like the vehicle to drive cautiously (e.g., like Alicia), and then realize that she is running later and switch to a faster operation mode (e.g., like Carole). The operational situation may also change based on detection. For example, if a vehicle is operating under an operational situation for a particular portion of road, and detects that it has left that portion of road, it may automatically switch to an operational situation appropriate for its location (e.g., for that city), may revert to a default operation (e.g., a baseline program that operates the vehicle) or operational situation (e.g., the last used). In some embodiments, if the vehicle detects that it needs to change operational situations, it may prompt a passenger or operator to choose a new operational situation.

In some embodiments, the computer-based reasoning model is received before process 500 begins (not depicted in FIG. 5), and the process begins by receiving 520 the current context. For example, the computer-based reasoning model may already be loaded into a controller 320 and the process 500 begins by receiving 520 the current context for the system being controlled. In some embodiments, referring to FIG. 3A and FIG. 3B, the current context for a system to be controlled (not depicted in FIG. 3A and FIG. 3B) may be sent to control engine 320, and control engine 320 may receive 520 current context for the system.

Receiving 520 current context may include receiving the context data needed for a determination to be made using the computer-based reasoning model. For example, turning to the vehicular example, receiving 520 the current context may, in various embodiments, include receiving information from sensors on or near the vehicle, determining information based on location or other sensor information, accessing data about the vehicle or location, etc. For example, the vehicle may have numerous sensors related to the vehicle and its operation, such as one or more of each of the following: speed sensors, tire pressure monitors, fuel gauges, compasses, global positioning systems (GPS), RADARs, LiDARs, cameras, barometers, thermal sensors, accelerometers, strain gauges, noise/sound measurement systems, etc. Current context may also include information determined based on sensor data. For example, the time to impact with the closest object may be determined based on distance calculations from RADAR or LiDAR data, and/or may be determined based on depth-from-stereo information from cameras on the vehicle. Context may include characteristics of the sensors, such as the distance a RADAR or LiDAR is capable of detecting, resolution and focal length of the cameras, etc. Context may include information about the vehicle not from a sensor. For example, the weight of the vehicle, acceleration, deceleration, and turning or maneuverability information may be known for the vehicle and may be part of the context information. Additionally, context may include information about the location, including road condition, wind direction and strength, weather, visibility, traffic data, road layout, etc.

Referring back to the example of vehicle control rules for Bob flying a helicopter, the context data for a later flight of the helicopter using the vehicle control rules based on Bob's operation of the helicopter may include fuel remaining, distance that fuel can allow the helicopter to travel, location including elevation, wind speed and direction, visibility, location and type of sensors as well as the sensor data, time to impact with the N closest objects, maneuverability and speed control information, etc. Returning to the stop sign example, whether using vehicle control rules based on Alicia or Carole, the context may include LiDAR, RADAR, camera and other sensor data, location information, weight of the vehicle, road condition and weather information, braking information for the vehicle, etc.

The control system then determined 530 an action to take based on the current context and the computer-based reasoning model. For example, turning to the vehicular example, an action to take is determined 530 based on the current context and the vehicle control rules for the current operational situation. In some embodiments that use machine learning, the vehicle control rules may be in the form of a neural network (as described elsewhere herein), and the context may be fed into the neural network to determine an action to take. In embodiments using case-based reasoning, the set of context-action pairs closest (or most similar) to the current context may be determined. In some embodiments, only the closest context-action pair is determined, and the action associated with that context-action pair is the determined 530 action. In some embodiments, multiple context-action pairs are determined 530. For example, the N "closest" context-action pairs may be determined 530, and either as part of the determining 530, or later as part of the causing 540 performance of the action, choices may be made on the action to take based on the N closest context-action pairs, where "distance" for between the current context can be measured using any appropriate technique, including use of Euclidean distance, Minkowski distance, Damerau-Levenshtein distance, Kullback-Leibler divergence, and/or any other distance measure, metric, pseudometric, premetric, index, or the like.

In some embodiments, the actions to be taken may be blended based on the action of each context-action pair, with invalid (e.g., impossible or dangerous) outcomes being discarded. A choice can also be made among the N context-action pairs chosen based on criteria such as choosing to use the same or different operator context-action pair from the last determined action. For example, in an embodiment where there are context-action pair sets from multiple operators in the vehicle control rules, the choice of which context-action pair may be based on whether a context-action pair from the same operator was just chosen (e.g., to maintain consistency). The choice among the top N context-action pairs may also be made by choosing at random, mixing portions of the actions together, choosing based on a voting mechanism, etc.

Some embodiments include detecting gaps in the training data and/or vehicle control rules and indicating those during operation of the vehicle (for example, via prompt and/or spoken or graphical user interface) or offline (for example, in a report, on a graphical display, etc.) to indicate what additional training is needed (not depicted in FIG. 5). In some embodiments, when the computer-based reasoning system does not find context "close enough" to the current context to make a confident decision on an action to take, it may indicate this and suggest that an operator might take manual control of the vehicle, and that operation of the vehicle may provide additional context and action data for the computer-based reasoning system. Additionally, in some embodiments, an operator may indicate to a vehicle that she would like to take manual control to either override the computer-based reasoning system or replace the training data. These two scenarios may differ by whether the data (for example, context-action pairs) for the operational scenario are ignored for this time period, or whether they are replaced.

In some embodiments, the operational situation may be chosen based on a confidence measure indicating confidence in candidate actions to take from two (or more) different sets of control rules (not depicted in FIG. 5). Consider a first operational situation associated with a first set of vehicle control rules (e.g., with significant training from Alicia driving on highways) and a second operational situation associated with a second set of vehicle control rules (e.g., with significant training from Carole driving on rural roads). Candidate actions and associated confidences may be determined for each of the sets of vehicle control rules based on the context. The determined 530 action to take may then be selected as the action associated with the higher confidence level. For example, when the vehicle is driving on the highway, the actions from the vehicle control rules associated with Alicia may have a higher confidence, and therefore be chosen. When the vehicle is on rural roads, the actions from the vehicle control rules associated with Carole may have higher confidence and therefore be chosen. Relatedly, in some embodiments, a set of vehicle control rules may be hierarchical, and actions to take may be propagated from lower levels in the hierarchy to high levels, and the choice among actions to take propagated from the lower levels may be made on confidence associated with each of those chosen actions. The confidence can be based on any appropriate confidence calculation including, in some embodiments, determining how much "extra information" in the vehicle control rules is associated with that action in that context.

In some embodiments, there may be a background or baseline operational program that is used when the computer-based reasoning system does not have sufficient data to make a decision on what action to take (not depicted in FIG. 5). For example, if in a set of vehicle control rules, there is no matching context or there is not a matching context that is close enough to the current context, then the background program may be used. If none of the training data from Alicia included what to do when crossing railroad tracks, and railroad tracks are encountered in later operation of the vehicle, then the system may fall back on the baseline operational program to handle the traversal of the railroad tracks. In some embodiments, the baseline model is a computer-based reasoning system, in which case context-action pairs from the baseline model may be removed when new training data is added. In some embodiments, the baseline model is an executive driving engine which takes over control of the vehicle operation when there are no matching contexts in the vehicle control rules (e.g., in the case of a context-based reasoning system, there might be no context-action pairs that are sufficiently "close").

In some embodiments, determining 530 an action to take based on the context can include determining whether vehicle maintenance is needed. As described elsewhere herein, the context may include wear and/or timing related to components of the vehicle, and a message related to maintenance may be determined based on the wear or timing. The message may indicate that maintenance may be needed or recommended (e.g., because preventative maintenance is often performed in the timing or wear context, because issues have been reported or detected with components in the timing or wear context, etc.). The message may be sent to or displayed for a vehicle operator (such as a fleet management service) and/or a passenger. For example, in the context of an automobile with sixty thousand miles, the message sent to a fleet maintenance system may include an indication that a timing belt may need to be replaced in order to avoid a P percent chance that the belt will break in the next five thousand miles (where the predictive information may be based on previously-collected context and action data, as described elsewhere herein). When the automobile reaches ninety thousand miles and assuming the belt has not been changed, the message may include that the chance that the belt will break has increased to, e.g., P*4 in the next five thousand miles.

Performance of the determined 530 action is then caused 540. Turning to the vehicular example, causing 540 performance of the action may include direct control of the vehicle and/or sending a message to a system, device, or interface that can control the vehicle. The action sent to control the vehicle may also be translated before it is used to control the vehicle. For example, the action determined 530 may be to navigate to a particular waypoint. In such an embodiment, causing 540 performance of the action may include sending the waypoint to a navigation system, and the navigation system may then, in turn, control the vehicle on a finer-grained level. In other embodiments, the determined 530 action may be to switch lanes, and that instruction may be sent to a control system that would enable the car to change the lane as directed. In yet other embodiments, the action determined 530 may be lower-level (e.g., accelerate or decelerate, turn 4° to the left, etc.), and causing 540 performance of the action may include sending the action to be performed to a control of the vehicle, or controlling the vehicle directly. In some embodiments, causing 540 performance of the action includes sending one or more messages for interpretation and/or display. In some embodiments, the causing 540 the action includes indicating the action to be taken at one or more levels of a control hierarchy for a vehicle. Examples of control hierarchies are given elsewhere herein.

Some embodiments include detecting anomalous actions taken or caused 540 to be taken. These anomalous actions may be signaled by an operator or passenger, or may be detected after operation of the vehicle (e.g., by reviewing log files, external reports, etc.). For example, a passenger of a vehicle may indicate that an undesirable maneuver was made by the vehicle (e.g., turning left from the right lane of a 2-lane road) or log files may be reviewed if the vehicle was in an accident. Once the anomaly is detected, the portion of the vehicle control rules (e.g., context-action pair(s)) related to the anomalous action can be determined. If it is determined that the context-action pair(s) are responsible for the anomalous action, then those context-action pairs can be removed or replaced using the techniques herein.

Referring to the example of the helicopter fleet and the vehicle control rules associated with Bob, the vehicle control 320 may determine 530 what action to take for the helicopter based on the received 520 context. The vehicle control 320 may then cause the helicopter to perform the determined action, for example, by sending instructions related to the action to the appropriate controls in the helicopter. In the driving example, the vehicle control 320 may determine 530 what action to take based on the context of vehicle. The vehicle control may then cause 540 performance of the determined 530 action by the automobile by sending instructions to control elements on the vehicle.

If there are more 550 contexts for which to determine actions for the operation of the system, then the process 500 returns to receive 510 more current contexts. Otherwise, process 500 ceases 560 control of the system. Turning to the vehicular example, as long as there is a continuation of operation of the vehicle using the vehicle control rules, the process 500 returns to receive 520 the subsequent current context for the vehicle. If the operational situation changes (e.g., the automobile is no longer on the stretch of road associated with the operational situation, a passenger indicates a new operational situation, etc.), then the process returns to determine the new operational situation. If the vehicle is no longer operating under vehicle control rules (e.g., it arrived at its destination, a passenger took over manual control, etc.), then the process 500 will discontinue 560 autonomous control of the vehicle.

Many of the examples discussed herein for vehicles discuss self-driving automobiles. As depicted in FIG. 3A and FIG. 3B, numerous types of vehicles can be controlled. For example, a helicopter 351 or drone, a submarine 352, or boat or freight ship 353, or any other type of vehicle such as plane or drone (not depicted in FIG. 3A and FIG. 3B), construction equipment, (not depicted in FIG. 3A and FIG. 3B), and/or the like. In each case, the computer-based reasoning model may differ, including using different features, using different techniques described herein, etc. Further, the context of each type of vehicle may differ. Flying vehicles may need context data such as weight, lift, drag, fuel remaining, distance remaining given fuel, windspeed, visibility, etc. Floating vehicles, such as boats, freight vessels, submarines, and the like may have context data such as buoyancy, drag, propulsion capabilities, speed of currents, a measure of the choppiness of the water, fuel remaining, distance capability remaining given fuel, and the like. Manufacturing and other equipment may have as context width of area traversing, turn radius of the vehicle, speed capabilities, towing/lifting capabilities, and the like.

Image Labelling

The techniques herein may also be used for image-labeling systems. For example, numerous experts may label images (e.g., identifying features of or elements within those images). For example, the human experts may identify cancerous masses on x-rays. Having these experts label all input images is incredibly time consuming to do on an ongoing basis, in addition to being expensive (paying the experts). The techniques herein may be used to train an image-labeling computer-based reasoning model based on previously-trained images. Once the image-labeling computer-based reasoning system has been built, then input images may be analyzed using the image-based reasoning system. In order to build the image-labeling computer-based reasoning system, images may be labeled by experts and used as training data. Using the techniques herein, the surprisal and/or conviction of the training data can be used to build an image-labeling computer-based reasoning system that balances the size of the computer-based reasoning model with the information that each additional image (or set of images) with associated labels provides. Once the image-labelling computer-based reasoning is trained, it can be used to label images in the future. For example, a new image may come in, the image-labelling computer-based reasoning may determine one or more labels for the image, and then the one or more labels may then be applied to the image. Thus, these images can be labeled automatically, saving the time and expense related to having experts label the images.

In some embodiments, processes 100, 200, 201, 500 may include determining the surprisal and/or conviction of each image (or multiple images) and the associated labels or of the aspects of the computer-based reasoning model. The surprisal and/or conviction for the one or more images may be determined and a determination may be made whether to select or include the one or more images (or aspects) in the image-labeling computer-based reasoning model based on the determined surprisal and/or conviction. While there are more sets of one or more images with labels to assess, the process may return to determine whether more image or label sets should be included or whether aspects should be included and/or changed in the model. Once there are no more images or aspects to consider, the process can turn to controlling the image analysis system using the image-labeling computer-based reasoning.

In some embodiments, processes 100, 200, and 201 may determine candidate and evolved programs. Using the evolved programs, the process can cause 299 control of an image-labeling system using process 500. For example, if the data elements are related to images and labels applied to those images, then the image-labeling computer-based reasoning model trained on that data will apply labels to incoming images. Process 500 proceeds by receiving 510 an image-labeling computer-based reasoning model. The process proceeds by receiving 520 an image for labeling. The image-labeling computer-based reasoning model is then used to determine 530 labels for the input image. The image is then labeled 540. If there are more 550 images to label, then the system returns to receive 510 those images and otherwise ceases 560. In such embodiments, the image-labeling computer-based reasoning model may be used to select labels based on which training image is "closest" (or most similar) to the incoming image. The label(s) associated with that image will then be selected to apply to the incoming image.

Manufacturing and Assembly

The processes 100, 200, 201, 500 may also be used for manufacturing and/or assembly. For example, conviction can be used to identify normal behavior versus anomalous behavior of such equipment. Using the techniques herein, a crane (e.g., crane 355 of FIG. 3B), robot arm, or other actuator is attempting to "grab" something and its surprisal is too high, it can stop, sound an alarm, shutdown certain areas of the facility, and/or request for human assistance. Anomalous behavior that is detected via conviction among sensors and actuators can be used to detect when there is some sort breakdown, unusual wear or mechanical or other malfunction, etc. It can also be used to find damaged equipment for repairs or buffing or other improvements for any robots or other machines that are searching and correcting defects in products or themselves (e.g., fixing a broken wire or smoothing out cuts made to the ends of a manufactured artifact made via an extrusion process). Conviction can also be used for cranes and other grabbing devices to find which cargo or items are closest matches to what is needed. Conviction can be used to drastically reduce the amount of time to train a robot to perform a new task for a new product or custom order, because the robot will indicate the aspects of the process it does not understand and direct training towards those areas and away from things it has already learned. Combining this with stopping ongoing actions when an anomalous situation is detected would also allow a robot to begin performing work before it is fully done training, the same way that a human apprentice may help out someone experienced while the apprentice is learning the job. Conviction can also inform what features or inputs to the robot are useful and which are not.

As an additional example in the manufacturing or assembly context, vibration data can be used to diagnose (or predict) issues with equipment. In some embodiments, the training data for the computer-based reasoning system would be vibration data (e.g., the output of one or more piezo vibration sensors attached to one or more pieces of manufacturing equipment) for a piece of equipment along with diagnosis of an issue or error that occurred with the equipment. The training data may similarly include vibration data for the manufacturing equipment that is not associated with an issue or error with the equipment. In subsequent operation of the same or similar equipment, the vibration data can be collected, and the computer-based reasoning model can be used to assess that vibration data to either diagnose or predict potential issues or errors with the equipment. For example, the vibration data for current (or recent) operation of one or more pieces of equipment, the computer-based reasoning model may be used to predict, diagnose, or otherwise determine issues or errors with the equipment. As a more specific example, a current context of vibration data for one or more pieces of manufacturing equipment may result in a diagnosis or prediction of various conditions, including, but not limited to: looseness of a piece of equipment (e.g., a loose screw), an imbalance on a rotating element (e.g., grime collected on a rotating wheel), misalignment or shaft runout (e.g., machine shafts may be out of alignment or not parallel), wear (e.g., ball or roller bearings, drive belts or gears become worn, they might cause vibration). As a further example, misalignment can be caused during assembly or develop over time, due to thermal expansion, components shifting or improper reassembly after maintenance. When a roller or ball bearing becomes pitted, for instance, the rollers or ball bearing will cause a vibration each time there is contact at the damaged area. A gear tooth that is heavily chipped or worn, or a drive belt that is breaking down, can also produce vibration. Diagnosis or prediction of the issue or error can be made based on the current or recent vibration data, and a computer-based reasoning model training data from the previous vibration data and associated issues or errors. Diagnosing or predicting the issues of vibration can be especially important where the vibration can cause other issues. For example, wear on a bearing may cause a vibration that then loosens another piece of equipment, which then can cause other issues and damage to equipment, failure of equipment, and even failure of the assembly or manufacturing process.

In some embodiments, techniques herein may determine (e.g., in response to a request) the surprisal and/or conviction of one or more data elements (e.g., of the manufacturing equipment) or aspects (e.g., features of context-action pairs or aspects of the model) to potentially include in the manufacturing control computer-based reasoning model. The surprisal and/or conviction for the one or more manufacturing elements may be determined and a determination may be made whether to select or include the one or more manufacturing data elements or aspects in the manufacturing control computer-based reasoning model based on the determined surprisal and/or conviction. While there are more sets of one or more manufacturing data elements or aspects to assess (e.g., from additional equipment and/or from subsequent time periods), the process may return to determine whether more manufacturing data elements or aspects sets should be included in the computer-based reasoning model. Once there are no more manufacturing data elements or aspects to consider for inclusion, the process can turn to controlling the manufacturing system using the manufacturing control computer-based reasoning system.

In some embodiments, processes 100, 200, and 201 may determine candidate and evolved programs. Using the evolved programs, the process can cause 299 control of a manufacturing system may be accomplished by process 500. For example, if the data elements are related to manufacturing data elements or aspects, then the manufacturing control computer-based reasoning model trained on that data will cause control manufacturing or assemble. Process 500 proceeds by receiving 510 a manufacturing control computer-based reasoning model. The process proceeds by receiving 520 a context. The manufacturing control computer-based reasoning model is then used to determine 530 an action to take. The action is then performed by the control system (e.g., caused by the manufacturing control computer-based reasoning system). If there are more 550 contexts to consider, then the system returns to receive 510 those contexts and otherwise ceases 560. In such embodiments, the manufacturing control computer-based reasoning model may be used to control a manufacturing system. The chosen actions are then performed by a control system.

Smart Voice Control

The processes 100, 200, 201, 500 may be used for smart voice control. For example, combining multiple inputs and forms of analysis, the techniques herein can recognize if there is something unusual about a voice control request. For example, if a request is to purchase a high-priced item or unlock a door, but the calendar and synchronized devices indicate that the family is out of town, it could send a request to the person's phone before confirming the order or action; it could be that an intruder has recorded someone's voice in the family or has used artificial intelligence software to create a message and has broken in. It can detect other anomalies for security or for devices activating at unusual times, possibly indicating some mechanical failure, electronics failure, or someone in the house using things abnormally (e.g., a child frequently leaving the refrigerator door open for long durations). Combined with other natural language processing techniques beyond sentiment analysis, such as vocal distress, a smart voice device can recognize that something is different and ask, improving the person's experience and improving the seamlessness of the device into the person's life, perhaps playing music, adjusting lighting, or HVAC, or other controls. The level of confidence provided by conviction can also be used to train a smart voice device more quickly as it can ask questions about aspects of its use that it has the least knowledge about. For example: "I noticed usually at night, but also some days, you turn the temperature down in what situations should I turn the temperature down? What other inputs (features) should I consider?"

Using the techniques herein, a smart voice device may also be able to learn things it otherwise may not be able to. For example, if the smart voice device is looking for common patterns in any of the aforementioned actions or purchases and the conviction drops below a certain threshold, it can ask the person if it should take on a particular action or additional autonomy without prompting, such as "It looks like you're normally changing the thermostat to colder on days when you have your exercise class, but not on days when it is cancelled; should I do this from now on and prepare the temperature to your liking?"

In some embodiments, processes 100, 200, 201, 500 may include determining (e.g., in response to a request) the surprisal and/or conviction of one or more data elements (e.g., of the smart voice system) or aspects (e.g., features of the data or parameters of the model) to potentially include in the smart voice system control computer-based reasoning model. The surprisal for the one or more smart voice system data elements or aspects may be determined and a determination may be made whether to include the one or more smart voice system data elements or aspects in the smart voice system control computer-based reasoning model based on the determined surprisal and/or conviction. While there are more sets of one or more smart voice system data elements or aspects to assess, the process may return to determine whether more smart voice system data elements or aspects sets should be included. Once there are no more smart voice system data elements or aspects to consider, the process can turn to controlling the smart voice system using the smart voice system control computer-based reasoning model.

In some embodiments, processes 100, 200, and 201 may determine candidate and evolved programs. Using the evolved programs, the process can cause 299 control of a smart voice system using process 500. For example, if the data elements are related to smart voice system actions, then the smart voice system control computer-based reasoning model trained on that data will control smart voice systems. Process 500 proceeds by receiving 510 a smart voice computer-based reasoning model. The process proceeds by receiving 520 a context. The smart voice computer-based reasoning model is then used to determine 530 an action to take. The action is then performed by the control system (e.g., caused by the smart voice computer-based reasoning system). If there are more 550 contexts to consider, then the system returns to receive 510 those contexts and otherwise ceases 560. In such embodiments, the smart voice computer-based reasoning model may be used to control a smart voice system. The chosen actions are then performed by a control system.

Control of Federated Devices

The processes 100, 200, 201, 500 may also be used for federated device systems. For example, combining multiple inputs and forms of analysis, the techniques herein can recognize if there is something that should trigger action based on the state of the federated devices. For example, if the training data includes actions normally taken and/or statuses of federated devices, then an action to take could be an often-taken action in the certain (or related contexts). For example, in the context of a smart home with interconnected heating, cooling, appliances, lights, locks, etc., the training data could be what a particular user does at certain times of day and/or in particular sequences. For example, if, in a house, the lights in the kitchen are normally turned off after the stove has been off for over an hour and the dishwasher has been started, then when that context again occurs, but the kitchen light has not been turned off, the computer-based reasoning system may cause an action to be taken in the smart home federated systems, such as prompting (e.g., audio) whether the user of the system would like the kitchen lights to be turned off. As another example, training data may indicate that a user sets the house alarm and locks the door upon leaving the house (e.g., as detected via geofence). If the user leaves the geofenced location of the house and has not yet locked the door and/or set the alarm, the computer-based reasoning system may cause performance of an action such as inquiring whether it should lock the door and/or set an alarm. As yet another example, in the security context, the control may be for turning on/off cameras, or enact other security measures, such as sounding alarms, locking doors, or even releasing drones and the like. Training data may include previous logs and sensor data, door or window alarm data, time of day, security footage, etc. and when security measure were (or should have been) taken. For example, a context such as particular window alarm data for a particular basement window coupled with other data may be associated with an action of sounding an alarm, and when a context occurs related to that context, an alarm may be sounded.

In some embodiments, processes 100, 200, 201, 500 may include determining the surprisal and/or conviction of one or more data elements or aspects of the federated device control system for potential inclusion in the federated device control computer-based reasoning model. The surprisal for the one or more federated device control system data elements may be determined and a determination may be made whether to select or include the one or more federated device control system data elements in the federated device control computer-based reasoning model based on the determined surprisal and/or conviction. While there are more sets of one or more federated device control system data elements or aspects to assess, the process may return to determine whether more federated device control system data elements or aspect sets should be included. Once there are no more federated device control system data elements or aspects to consider, the process can turn to controlling the federated device control system using the federated device control computer-based reasoning model.

In some embodiments, processes 100, 200, and 201 may determine candidate and evolved programs. Using the evolved programs, the process can cause 299 control of a federated device system using process 500. For example, if the data elements are related to federated device system actions, then the federated device control computer-based reasoning model trained on that data will control federated device control system. Process 500 proceeds by receiving 510 a federated device control computer-based reasoning model. The process proceeds by receiving 520 a context. The federated device control computer-based reasoning model is then used to determine 530 an action to take. The action is then performed by the control system (e.g., caused by the federated device control computer-based reasoning system). If there are more 550 contexts to consider, then the system returns to receive 510 those contexts and otherwise ceases 560. In such embodiments, the federated device control computer-based reasoning model may be used to control federated devices. The chosen actions are then performed by a control system.

Control and Automation of Experiments

The processes 100, 200, 201, 500 may also be used to control laboratory experiments. For example, many lab experiments today, especially in the biological and life sciences, but also in agriculture, pharmaceuticals, materials science and other fields, yield combinatorial increases, in terms of numbers, of possibilities and results. The fields of design of experiment, as well as many combinatorial search and exploration techniques are currently combined with statistical analysis. However, conviction-based techniques such as those herein can be used to guide a search for knowledge, especially if combined with utility or fitness functions. Automated lab experiments (including pharmaceuticals, biological and life sciences, material science, etc.) may have actuators and may put different chemicals, samples, or parts in different combinations and put them under different circumstances. Using conviction to guide the machines enables them to home in on learning how the system under study responds to different scenarios, and, for example, searching areas of greatest uncertainty (e.g., the areas with low conviction as discussed herein). Conceptually speaking, when the conviction or surprisal is combined with a fitness, utility, or value function, especially in a multiplicative fashion, then the combination is a powerful information theoretic approach to the classic exploration vs exploitation trade-offs that are made in search processes from artificial intelligence to science to engineering. Additionally, such a system can automate experiments where it can predict the most effective approach, homing in on the best possible, predictable outcomes for a specific knowledge base. Further, like in the other embodiments discussed herein, it could indicate (e.g., raise alarms) to human operators when the results are anomalous, or even tell which features being measured are most useful (so that they can be appropriately measured) or when measurements are not sufficient to characterize the outcomes. This is discussed extensively elsewhere herein. If the system has multiple kinds of sensors that have "costs" (e.g., monetary, time, computation, etc.) or cannot be all activated simultaneously, the feature entropies or convictions could be used to activate or deactivate the sensors to reduce costs or improve the distinguishability of the experimental results.

In the context of agriculture, growers may experiment with various treatments (plant species or varietals, crop types, seed planting densities, seed spacings, fertilizer types and densities, etc.) in order to improve yield and/or reduce cost. In comparing the effects of different practices (treatments), experimenters or growers need to know if the effects observed in the crop or in the field are simply a product of the natural variation that occurs in every ecological system, or whether those changes are truly a result of the new treatments. In order to ameliorate the confusion caused by overlapping crop, treatment, and field effects, different design types can be used (e.g., demonstration strip, replication control or measurement, randomized block, split plot, factorial design, etc.). Regardless, however, of the type of test design type used, determination of what treatment(s) to use is crucial to success. Using the techniques herein to guide treatment selection (and possible design type) enables experimenters and growers to home in on how the system under study responds to different treatments and treatment types, and, for example, searching areas of greatest uncertainty in the "treatment space" (e.g., what are the types of treatments about which little is known?). Conceptually, the combination of conviction or surprisal with a value, utility, or fitness function such as yield, cost, or a function of yield and cost, become a powerful information theoretic approach to the classic exploration vs exploitation trade-offs that are made in search processes from artificial intelligence to science to engineering. Growers can use this information to choose treatments balancing exploitation (e.g., doing things similar to what has produced high yields previously) and exploration (e.g., trying treatments unlike previous ones, with yet-unknown results). Additionally, the techniques can automate experiments on treatments (either in selection of treatments, designs, or robotic or automated planting using the techniques described herein) where it can predict the most effective approach, and automatically perform the planting or other distribution (e.g., of fertilizer, seed, etc.) required of to perform the treatment. Further, like in the other embodiments discussed herein, it could indicate (e.g., raise alarms) to human operators when the results are anomalous, or even tell which features being measured are most useful or when measurements are not useful to characterize the outcomes (e.g., and may possibly be discarded or no longer measured). If the system has types of sensors (e.g., soil moisture, nitrogen levels, sun exposure) that have "costs" (e.g., monetary, time, computation, etc.) or cannot be all collected or activated simultaneously, the feature entropies or convictions could be used to activate or deactivate the sensors to reduce costs while protecting the usefulness of the experimental results.

In some embodiments, processes 100, 200, 201, 500 may include determining (e.g., in response to a request) the surprisal and/or conviction of one or more data elements or aspects of the experiment control system. The surprisal for the one or more experiment control system data elements or aspects may be determined and a determination may be made whether to select or include the one or more experiment control system data elements or aspects in an experiment control computer-based reasoning model based on the determined surprisal and/or conviction. While there are more sets of one or more experiment control system data elements or aspects to assess, the process may return to determine whether more experiment control system data elements or aspects sets should be included. Once there are no more experiment control system data elements or aspects to consider, the process can cause 299 control of the experiment control system using the experiment control computer-based reasoning model.

In some embodiments, processes 100, 200, and 201 may determine candidate and evolved programs. Using the evolved programs, the process can cause 299 control of an experiment control system using process 500. For example, if the data elements are related to experiment control system actions, then the experiment control computer-based reasoning model trained on that data will control experiment control system. Process 500 proceeds by receiving 510 an experiment control computer-based reasoning model. The process proceeds by receiving 520 a context. The experiment control computer-based reasoning model is then used to determine 530 an action to take. The action is then performed by the control system (e.g., caused by the experiment control computer-based reasoning system). If there are more 550 contexts to consider, then the system returns to receive 510 those contexts and otherwise ceases 560. In such embodiments, the experiment control computer-based reasoning model may be used to control experiment. The chosen actions are then performed by a control system.

Control of Energy Transfer Systems

The processes 100, 200, 201, 500 may also be used for control systems for energy transfer. For example, a building may have numerous energy sources, including solar, wind, grid-based electrical, batteries, on-site generation (e.g., by diesel or gas), etc. and may have many operations it can perform, including manufacturing, computation, temperature control, etc. The techniques herein may be used to control when certain types of energy are used and when certain energy consuming processes are engaged. For example, on sunny days, roof-mounted solar cells may provide enough low-cost power that grid-based electrical power is discontinued during a particular time period while costly manufacturing processes are engaged. On windy, rainy days, the overhead of running solar panels may overshadow the energy provided, but power purchased from a wind-generation farm may be cheap, and only essential energy consuming manufacturing processes and maintenance processes are performed.

In some embodiments, processes 100, 200, 201, 500 may include determining (e.g., in response to a request) the surprisal and/or conviction of one or more data elements or aspects of the energy transfer system. The surprisal for the one or more energy transfer system data elements or aspects may be determined and a determination may be made whether to select or include the one or more energy transfer system data elements or aspects in energy control computer-based reasoning model based on the determined surprisal and/or conviction. While there are more sets of one or more energy transfer system data elements or aspects to assess, the process may return to determine whether more energy transfer system data elements or aspects should be included. Once there are no more energy transfer system data elements or aspects to consider, the process can turn to controlling the energy transfer system using the energy control computer-based reasoning model.

In some embodiments, processes 100, 200, and 201 may determine candidate and evolved programs. Using the evolved programs, the process can cause 299 control of an energy transfer system using process 500. For example, if the data elements are related to energy transfer system actions, then the energy control computer-based reasoning model trained on that data will control energy transfer system. Process 500 proceeds by receiving 510 an energy control computer-based reasoning model. The process proceeds by receiving 520 a context. The energy control computer-based reasoning model is then used to determine 530 an action to take. The action is then performed by the control system (e.g., caused by the energy control computer-based reasoning system). If there are more 550 contexts to consider, then the system returns to receive 510 those contexts and otherwise ceases 560. In such embodiments, the energy control computer-based reasoning model may be used to control energy. The chosen actions are then performed by a control system.

Health Care Decision Making and Prediction

The processes 100, 200, 201, 500 may also be used for health care decision making and prediction (such as outcome prediction). For example, some health insurers require pre-approval, pre-certification, and/or pre-authorization for certain types of healthcare procedures, such as healthcare services, administration of drugs, surgery, hospital visits, etc. In such circumstances, a health care professional must contact the insurer to obtain their approval prior to administering care, or else the health insurance company may not cover the procedure. Not all services require pre-approval, but many may, and which require it can differ among insurers. Health insurance companies may make determinations including, but not necessarily limited to, whether a procedure is medically necessary, whether it is duplicative, whether it follows currently-accepted medical practice, whether there are anomalies in the care or its procedures, whether there are anomalies or errors with the health care provider or professional, etc. In some embodiments, a health insurance company may have many "features" of data on which health care pre-approval decisions are determined by human operators. These features may include diagnosis information, type of health insurance, requesting health care professional and facility, frequency and/or last claim of the particular type, etc. The data on previous decisions can be used to train the computer-based reasoning system. The techniques herein may be used to guide the health care decision making process. For example, when the computer-based reasoning model determines, with high conviction or confidence, that a procedure should be pre-approved, it may pre-approve the procedure without further review. In some embodiments, when the computer-based reasoning model has low conviction re whether or not to pre-approve a particular procedure, it may flag it for human review (including, e.g., sending it back to the submitting organization for further information). In some embodiments, some or all of the rejections of procedure pre-approval may be flagged for human review.

Further, in some embodiments, the techniques herein can be used to flag trends. anomalies, and/or errors in detection. For example, as explained in detail elsewhere herein, the techniques can be used to determine, for example, when there are anomalies for a request for pre-approval with respect to the computer-based reasoning model. When the anomaly is detected, (e.g., a procedure or prescription has been requested outside the normal range of occurrences per time period, for an individual that is outside the normal range of patients, etc.), the pre-approval can be flagged for further review. In some cases, these anomalies could be errors (e.g., and the health professional or facility may be contacted to rectify the error), explainable anomalies (e.g., patients that need care outside of the normal bounds), or unexplainably anomalies. Additionally, in some embodiments, the techniques herein can be used to determine and flag trends (e.g., for an individual patient, set of patients, health department or facility, region, etc.). The techniques herein may be useful not only because they can automate and/or flag pre-approval decision, but also because the trained computer-based reasoning model may contain information (e.g., prior decision) from multiple (e.g., 10 s, 100 s, 1000 s, or more) prior decision makers. Consideration of this large amount of information may be untenable for other approaches, such as human review.

The techniques herein may also be used to predict adverse outcomes in numerous health care contexts. The computer-based reasoning model may be trained with data from previous adverse events, and perhaps from patients that did not have adverse events. The trained computer-based reasoning system can then be used to predict when a current or prospective patient or treatment is likely to cause an adverse event. For example, if a patient arrives at a hospital, the patient's information and condition may be assessed by the computer-based reasoning model using the techniques herein in order to predict whether an adverse event is probable (and the conviction of that determination). As a more specific example, if a septuagenarian with a history of low blood pressure is admitted for monitoring a heart murmur, the techniques herein may flag that patient for further review. In some embodiments, the determination of an adverse outcome may be an indication of one or more possible adverse events, such as a complication, having an additional injury, sepsis, increased morbidity, and/or getting additionally sick, etc. Returning to the example of the septuagenarian with a history of low blood pressure, the techniques herein may indicate that, based on previous data, the possibility of a fall in the hospital is unduly high (possibly with high conviction). Such information can allow the hospital to try to ameliorate the situation and attempt to prevent the adverse event before it happens.

In some embodiments, the techniques herein include assisting in diagnosis and/or diagnosing patients based on previous diagnosis data and current patient data. For example, a computer-based reasoning model may be trained with previous patient data and related diagnoses using the techniques herein. The diagnosis computer-based reasoning model may then be used in order to suggest one or more possible diagnoses for the current patient. As a more specific example, a septuagenarian may present with specific attributes, medical history, family history, etc. This information may be used as the input context to the diagnosis computer-based reasoning system, and the diagnosis computer-based reasoning system may determine one or more possible diagnoses for the septuagenarian. In some embodiments, those possible diagnoses may then be assessed by medical professionals. The techniques herein may be used to diagnose any condition, including, but not limited to breast cancer, lung cancer, colon cancer, prostate cancer, bone metastases, coronary artery disease, congenital heart defect, brain pathologies, Alzheimer's disease, and/or diabetic retinopathy.

In some embodiments, the techniques herein may be used to generate synthetic data that mimics, but does not include previous patient data. This synthetic data generation is available for any of the uses of the techniques described herein (manufacturing, image labelling, self-driving vehicles, etc.), and can be particularly important in circumstances where using user data (such as patient health data) in a model may be contrary to policy or regulation. As discussed elsewhere herein, the synthetic data can be generated to directly mimic the characteristics of the patient population, or more surprising data can be generated (e.g., higher surprisal) in order to generate more data in the edge cases, all without a necessity of including actual patient data.

In some embodiments, processes 100, 200, 201, 500 may include determining (e.g., in response to a request) the surprisal and/or conviction of one or more data elements or aspects of the health care system. The surprisal or conviction for the one or more health care system data elements or aspects may be determined and a determination may be made whether to select or include the one or more health care system data elements or aspects in a health care system computer-based reasoning model based on the determined surprisal and/or conviction. While there are more sets of one or more health care system data elements or aspects to assess, the process may return to determine whether more health care system data elements or aspects should be included. Once there are no more health care system data elements or aspects to consider included in the model, the process can turn to controlling the health care computer-based reasoning system using the health care system computer-based reasoning model.

In some embodiments, processes 100, 200, and 201 may determine candidate and evolved programs. Using the evolved programs, the process can cause 299 control of a health care computer-based reasoning system using process 500. For example, if the data elements are related to health care system actions, then the health care system computer-based reasoning model trained on that data will control the health care system. Process 500 proceeds by receiving 510 a health care system computer-based reasoning model. The process proceeds by receiving 520 a context. The health care system computer-based reasoning model is then used to determine 530 an action to take. The action is then performed by the control system (e.g., caused by the health care system computer-based reasoning system). If there are more 550 contexts to consider, then the system returns to receive 510 those contexts and otherwise ceases 560. In such embodiments, the health care system computer-based reasoning model may be used to assess health care decisions, predict outcomes, etc. In some embodiments, the chosen action(s) are then performed by a control system.

Cybersecurity

The processes 100, 200, 201, 500 may also be used for cybersecurity analysis. For example, a cybersecurity company or other organization may want to perform threat (or anomalous behavior) analysis, and in particular may want explanation data associated with the threat or anomalous behavior analysis (e.g., why was a particular event, user, etc. identified as a threat or not a threat?). The computer-based reasoning model may be trained using known threats/anomalous behavior and features associated with those threats or anomalous behavior. Data that represents neither a threat nor anomalous behavior (e.g., non-malicious access attempts, non-malicious emails, etc.) may also be used to train the computer-based reasoning model. In some embodiments, when a new entity, user, packet, payload, routing attempt, access attempt, log file, etc. is ready for assessment, the features associated with that new entity, user, packet, payload, routing attempt, access attempt, log file, etc. may be used as input in the trained cybersecurity computer-based reasoning system. The cybersecurity computer-based reasoning system may then determine the likelihood that the entity, user, packet, payload, routing attempt, access attempt, pattern in the log file, etc. is or represents a threat or anomalous behavior. Further, explanation data, such as a conviction measures, training data used to make a decision etc., can be used to mitigate the threat or anomalous behavior and/or be provided to a human operator in order to further assess the potential threat or anomalous behavior.

Any type of cybersecurity threat or anomalous behavior can be analyzed and detected, such as denial of service (DoS), distributed DOS (DDoS), brute-force attacks (e.g., password breach attempts), compromised credentials, malware, insider threats, advanced persistent threats, phishing, spear phishing, etc. and/or anomalous traffic volume, bandwidth use, protocol use, behavior of individuals and/or accounts, logfile pattern, access or routing attempt, etc. In some embodiments the cybersecurity threat is mitigated (e.g., access is suspended, etc.) while the threat is escalated to a human operator. As a more specific example, if an email is received by the email server, the email may be provided as input to the trained cybersecurity computer-based reasoning model. The cybersecurity computer-based reasoning model may indicate that the email is a potential threat (e.g., detecting and then indicating that email includes a link to a universal resource locator that is different from the universal resource location displayed in the text of the email). In some embodiments, this email may be automatically deleted, may be quarantined, and/or flagged for review.

In some embodiments, processes 100, 200, 201, 500 may include determining (e.g., in response to a request) the surprisal and/or conviction of one or more data elements or aspects of the cybersecurity system. The surprisal or conviction for the one or more cybersecurity system data elements or aspects may be determined and a determination may be made whether to select or include the one or more cybersecurity system data elements or aspects in a cybersecurity system computer-based reasoning model based on the determined surprisal and/or conviction. While there are more sets of one or more cybersecurity system data elements or aspects to assess, the process may return to determine whether more cybersecurity system data elements or aspects should be included. Once there are no more cybersecurity system data elements or aspects to consider, the process can turn to controlling the cybersecurity computer-based reasoning system using the cybersecurity system computer-based reasoning model.

In some embodiments, processes 100, 200, and 201 may determine candidate and evolved programs. Using the evolved programs, the process can cause 299 control of a cybersecurity computer-based reasoning system using process 500. For example, if the data elements are related to cybersecurity system actions, then the cybersecurity system computer-based reasoning model trained on that data will control the cybersecurity system (e.g., quarantine, delete, or flag for review, entities, data, network traffic, etc.). Process 500 proceeds by receiving 510 a cybersecurity system computer-based reasoning model. The process proceeds by receiving 520 a context. The cybersecurity system computer-based reasoning model is then used to determine 530 an action to take. The action is then performed by the control system (e.g., caused by the cybersecurity system computer-based reasoning system). If there are more 550 contexts to consider, then the system returns to receive 510 those contexts and otherwise ceases 560. In such embodiments, the cybersecurity system computer-based reasoning model may be used to assess cybersecurity threats, etc. In some embodiments, the chosen action(s) are then performed by a control system.

Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as an OLED, LED or cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. The input device 414 may also have multiple input modalities, such as multiple 2-axes controllers, and/or input buttons or keyboard. This allows a user to input along more than two dimensions simultaneously and/or control the input of more than one type of action.

Computer system 400 may implement the techniques described herein using customized hard-wired logic, one or more ASICs or FPGAs, firmware and/or program logic which in combination with the computer system causes or programs computer system 400 to be a special-purpose machine. According to some embodiments, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information. Such a wireless link could be a Bluetooth, Bluetooth Low Energy (BLE), 802.11 WiFi connection, or the like.

Network link 420 typically provides data communication through one or more networks to other data devices. For example, network link 420 may provide a connection through local network 422 to a host computer 424 or to data equipment operated by an Internet Service Provider (ISP)

426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   determining compatibility for evolution of first candidate code and second candidate code based at least in part on functionalities of the first candidate code and the second candidate code, wherein:
   the first candidate code comprises at least a first context element and a first action;
   the second candidate code comprises at least a second context element and a second action, wherein the first context element differs from the second context element;
   when the first candidate code and the second candidate code are determined to be compatible for evolution, evolving third candidate code, using evolutionary programming techniques, based on the first candidate code and the second candidate code, wherein the third candidate code differs from both the first candidate code and the second candidate code, and contains no more than a subset of code from each of the first candidate code and the second candidate code;
   providing the third candidate code as evolved code,
   wherein evolving the third candidate code based on the first candidate code and the second candidate code comprises:
   evolving a third, evolved context element from the first context element and the second context element:
   including in the third candidate code the third, evolved context element;
   when the first action and the second action are identical, including the first action in the third candidate code,
   wherein the method is performed on one or more computing devices.

2. The method of claim 1, further comprising:
   initially receiving a request for evolved code;
   providing the third candidate code is provided as the evolved code.

3. The method of claim 1,
   wherein evolving the third candidate code, using evolutionary programming techniques comprises performing a cross-over of the first candidate code and the second candidate code to produce the third candidate code, wherein the third candidate code contains no more than a subset of the first candidate code and the second candidate code.

4. The method of claim 1,
   wherein evolving the third candidate code, using evolutionary programming techniques comprises resampling at least a portion of the first candidate code and the second candidate code to produce the third candidate code, wherein the third candidate code contains no more than a subset of the first candidate code and the second candidate code.

5. The method of claim 1,
   wherein evolving the third candidate code, using evolutionary programming techniques comprises mutating at least a portion of the first candidate code or the second candidate code to produce the third candidate code, wherein the third candidate code contains no more than a subset of the first candidate code and the second candidate code.

6. The method of claim 1,
   wherein evolving the third candidate code, using evolutionary programming techniques comprises combining the first candidate code and the second candidate code to produce the third candidate code, wherein the third candidate code contains no more than a subset of the first candidate code and the second candidate code.

7. The method of claim 6,
   wherein evolving the third candidate code, using evolutionary programming techniques comprises combining the first candidate code and the second candidate code to produce the third candidate code, wherein the third candidate code contains at least a subset of the first candidate code, but no more than a subset of the first candidate code and at least a subset of the second candidate code, the second candidate code.

8. A system for executing instructions comprising one or more computing devices, wherein said instructions, when executed by the one or more computing devices, cause performance of a process including:
   determining compatibility for evolution of first candidate code and second candidate code based at least in part on functionalities of the first candidate code and the second candidate code, wherein:
   the first candidate code comprises a first action and a first context element;
   the second candidate code comprises a second action and a second context element, wherein the first action is different from the second action;
   when the first candidate code and the second candidate code are determined to be compatible for evolution, evolving third candidate code, using evolutionary programming techniques, based on the first candidate code and the second candidate code, wherein the third candidate code differs from both the first candidate code and the second candidate code, and contains no more than a subset of code from each of the first candidate code and the second candidate code;
   providing the third candidate code,
   wherein evolving the third candidate code based on the first candidate code and the second candidate code comprises:
   evolving a third, evolved action from the first action and the second action:

including in the third candidate code the third, evolved action; and when the first context element and the second context element are identical, including the first context element in the third candidate code.

9. The system of claim 8, further comprising:

initially receiving a request for evolved code;

providing the third candidate code is provided as the evolved code.

10. The system of claim 8, wherein evolving the third candidate code, using evolutionary programming techniques comprises performing a cross-over of the first candidate code and the second candidate code to produce the third candidate code, wherein the third candidate code contains no more than a subset of the first candidate code and the second candidate code.

11. The system of claim 8, wherein evolving the third candidate code, using evolutionary programming techniques comprises resampling at least a portion of the first candidate code and the second candidate code to produce the third candidate code, wherein the third candidate code contains no more than a subset of the first candidate code and the second candidate code.

12. The system of claim 8, wherein evolving the third candidate code, using evolutionary programming techniques comprises mutating at least a portion of the first candidate code or the second candidate code to produce the third candidate code, wherein the third candidate code contains no more than a subset of the first candidate code and the second candidate code.

13. The system of claim 8, wherein evolving the third candidate code, using evolutionary programming techniques comprises combining the first candidate code and the second candidate code to produce the third candidate code, wherein the third candidate code contains no more than a subset of the first candidate code and the second candidate code.

14. A non-transitory computer readable medium, storing instructions which, when executed by one or more computing devices, cause the one or more computing devices to perform a process of:

determining compatibility for evolution of first candidate code and second candidate code based at least in part on a first functionality of the first candidate code and a second functionality of the second candidate code, wherein:

the first candidate code comprises a first action and at least a first context element;

the second candidate code comprises a second action and at least a second context element, wherein the second action is different from the first action;

when the first candidate code and the second candidate code are determined to be compatible for evolution based at least in part on the first functionality and the second functionality, evolving third candidate code, using evolutionary programming techniques, based on the first candidate code and the second candidate code, wherein the third candidate code differs from both the first candidate code and the second candidate code, and contains no more than a subset of code from each of the first candidate code and the second candidate code;

providing the third candidate code, wherein evolving the third candidate code based on the first candidate code and the second candidate code comprises:

evolving a third, evolved action from the first action and the second action;

including in the third candidate code the third, evolved action; and when the first context element and the second context element are identical, including the first context element in the third candidate code.

15. The non-transitory computer readable medium of claim 14, further comprising:

determining whether exit criteria are met based at least in part on a fitness test performed on the third candidate code, and only when the exit criteria are met, the third candidate code is provided as evolved code.

16. The non-transitory computer readable medium of claim 14, wherein evolving the third candidate code, using evolutionary programming techniques comprises performing a cross-over of the first candidate code and the second candidate code to produce the third candidate code, wherein the third candidate code contains no more than a subset of the first candidate code and the second candidate code.

17. The non-transitory computer readable medium of claim 14, wherein evolving the third candidate code, using evolutionary programming techniques comprises resampling at least a portion of the first candidate code and the second candidate code to produce the third candidate code, wherein the third candidate code contains no more than a subset of the first candidate code and the second candidate code.

18. The non-transitory computer readable medium of claim 14, wherein evolving the third candidate code, using evolutionary programming techniques comprises mutating at least a portion of the first candidate code or the second candidate code to produce the third candidate code, wherein the third candidate code contains no more than a subset of the first candidate code and the second candidate code.

19. The non-transitory computer readable medium of claim 14, wherein evolving the third candidate code, using evolutionary programming techniques comprises combining the first candidate code and the second candidate code to produce the third candidate code, wherein the third candidate code contains no more than a subset of the first candidate code and the second candidate code.

20. The non-transitory computer readable medium of claim 14, wherein the process further comprises determining a resultant program based at least in part on the third candidate code; determining whether exit criteria are met based at least in part on the resultant program; and if the exit criteria are met, providing the resultant program as an evolved program.

21. The non-transitory computer readable medium of claim 20, wherein the process further comprises:

determining whether the second functionality does not occur in a first candidate executable program associated with the first candidate code; and when the second functionality does not occur in the first candidate executable program, determining the resultant program based at least in part on the second candidate code.

22. The non-transitory computer readable medium of claim 20, wherein the resultant program is executable code and determining the resultant program comprises determining the resultant program based on the third candidate code and a first candidate executable program associated with the first candidate code.

23. The non-transitory computer readable medium of claim 14, wherein the first action and the first context element each contain executable code.

24. The non-transitory computer readable medium of claim 14, wherein determining whether the first candidate code and the second candidate code are compatible comprises determining whether there is an exact match between a first label related to the first candidate code and a second label related to the second candidate code.

25. The non-transitory computer readable medium of claim 24, wherein determining whether the first candidate code and the second candidate code are compatible comprises determining a measure of compatibility based on the first label, the second label, the first candidate code, and the second candidate code.

26. The non-transitory computer readable medium of claim 14, wherein the first candidate code is associated with a first set of two or more labels and the second candidate code is associated with a second set of one or more labels, and determining whether the first candidate code and the second candidate code are compatible comprises determining whether the first set of two or more labels is compatible with the second set of one or more labels.

* * * * *